US011412527B2

(12) United States Patent
Park et al.

(10) Patent No.: US 11,412,527 B2
(45) Date of Patent: Aug. 9, 2022

(54) INTERFERENCE COORDINATION REGION CONFIGURATION

(71) Applicant: QUALCOMM Incorporated, San Diego, CA (US)

(72) Inventors: Sungwoo Park, San Diego, CA (US); Arumugam Chendamarai Kannan, San Diego, CA (US); Tao Luo, San Diego, CA (US); Srinivas Yerramalli, San Diego, CA (US); Vinay Chande, San Diego, CA (US); Mostafa Khoshnevisan, San Diego, CA (US); Jing Sun, San Diego, CA (US); Xiaoxia Zhang, San Diego, CA (US); Wooseok Nam, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 52 days.

(21) Appl. No.: 16/915,259

(22) Filed: Jun. 29, 2020

(65) Prior Publication Data

US 2021/0007117 A1    Jan. 7, 2021

Related U.S. Application Data

(60) Provisional application No. 62/869,555, filed on Jul. 1, 2019.

(51) Int. Cl.
*H04W 72/12* (2009.01)
*H04L 27/26* (2006.01)
(Continued)

(52) U.S. Cl.
CPC ...... *H04W 72/1231* (2013.01); *H04B 7/0617* (2013.01); *H04L 27/2615* (2013.01); *H04L 41/0803* (2013.01); *H04W 72/1242* (2013.01)

(58) Field of Classification Search
CPC .......... H04W 72/1231; H04W 72/1242; H04L 27/2615; H04L 41/0803; H04B 7/0617; H04B 1/1027; H01Q 3/2605
See application file for complete search history.

(56) References Cited

U.S. PATENT DOCUMENTS

| 2010/0248734 | A1* | 9/2010 | Yamazaki | ............ | H01Q 3/2605 |
| | | | | | 455/452.2 |
| 2016/0345309 | A1 | 11/2016 | Xiong et al. | | |

(Continued)

OTHER PUBLICATIONS

International Search Report and Written Opinion—PCT/US2020/040242—ISA/EPO—dated Sep. 14, 2020.

*Primary Examiner* — Huy D Vu
*Assistant Examiner* — Robert Ma
(74) *Attorney, Agent, or Firm* — Holland & Hart LLP

(57) ABSTRACT

Methods, systems, and devices for wireless communications are described. In some systems implementing beamforming, a neighboring base station may cause interference to a user equipment (UE) served by a different base station. To mitigate unexpected interference, an interference coordination region including time and frequency resources may be configured between the base stations. The interference coordination region may be configured based on long-term information for the base stations and may include one or both of a set of beam-avoidance sub-regions or a set of beam-preference sub-regions for a base station, where each sub-region is associated with a beam index. A base station may schedule a communication beam in the interference coordination region based on a beam-avoidance region (e.g., refraining from using a particular communication beam) or a beam-preference region (e.g., prioritizing a particular communication beam). The base station may transmit a message to a UE using the scheduled communication beam.

46 Claims, 21 Drawing Sheets

(51) Int. Cl.
*H04B 7/06* (2006.01)
*H04L 41/0803* (2022.01)

(56) References Cited

U.S. PATENT DOCUMENTS

2017/0250747 A1   8/2017   Reinhardt et al.
2018/0124796 A1*  5/2018   Noh .................... H04B 1/1027

* cited by examiner

INTERFERENCE COORDINATION REGION CONFIGURATION

CROSS REFERENCE

The present application for patent claims the benefit of U.S. Provisional Patent Application No. 62/869,555 by PARK et al., entitled "INTERFERENCE COORDINATION REGION CONFIGURATION," filed Jul. 1, 2019, assigned to the assignee hereof, and expressly incorporated by reference herein.

BACKGROUND

The following relates generally to wireless communications and more specifically to interference handling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some systems, base stations and UEs may implement beamforming techniques for wireless communications. However, depending on the locations of the base stations and the directions and/or widths of the communication beams, some beams from neighboring base stations may interfere with one another. During these beamforming communications, the link quality between a UE and a serving base station may vary (e.g., decrease) depending on a neighboring base station's scheduling decision. The scheduling decision may include a transmission beam selection and/or a UE selection for communication. For example, the serving base station and neighboring base station may both transmit on beams such that the beams are directed toward the same geographic area at the same time, over the same frequency, or a combination thereof. In some cases, a level of interference (e.g., a high level of interference) may be experienced by one or more UEs within the geographic area monitoring for messages from the serving base station as a result of the scheduling decisions made by the neighboring base station.

SUMMARY

The described techniques relate to improved methods, systems, devices, and apparatuses that support interference coordination region configuration. Generally, the described techniques provide for mitigating unexpected interference between neighboring base stations (e.g., in specifically configured resource regions). A set of resources (e.g., time and frequency resources) may be configured as an interference coordination region by a centralized scheduler or by a base station in a distributed manner. The interference coordination region may be configured based on long-term information reported by base stations that indicates historic trends of the network. The interference coordination region may include one or both of a set of beam-avoidance regions or a set of beam-preference regions, and each sub-region may be associated with a beam index. A beam-avoidance region of one base station may occupy the same or similar time and frequency resources as a beam-preference region of a neighboring base station. This pairing of regions may result in one base station prioritizing transmissions using a first communication beam in resources in which a neighboring base station is refraining from using a second communication beam, where signals on the second communication beam may interfere with signals on the first communication beam. This interference coordination using the beam-avoidance and beam-preference regions may reduce unexpected interference to messages transmitted using the first communication beam (i.e., the preferred beam in the beam-preference region). In some cases, a user equipment (UE) may message the serving base station to support the interference coordination or to indicate resources in which beam-avoidance is ignored (e.g., if a neighboring base station schedules a transmission using a communication beam that should be avoided in a beam-avoidance region).

DETAILED DESCRIPTION

Figure 1:
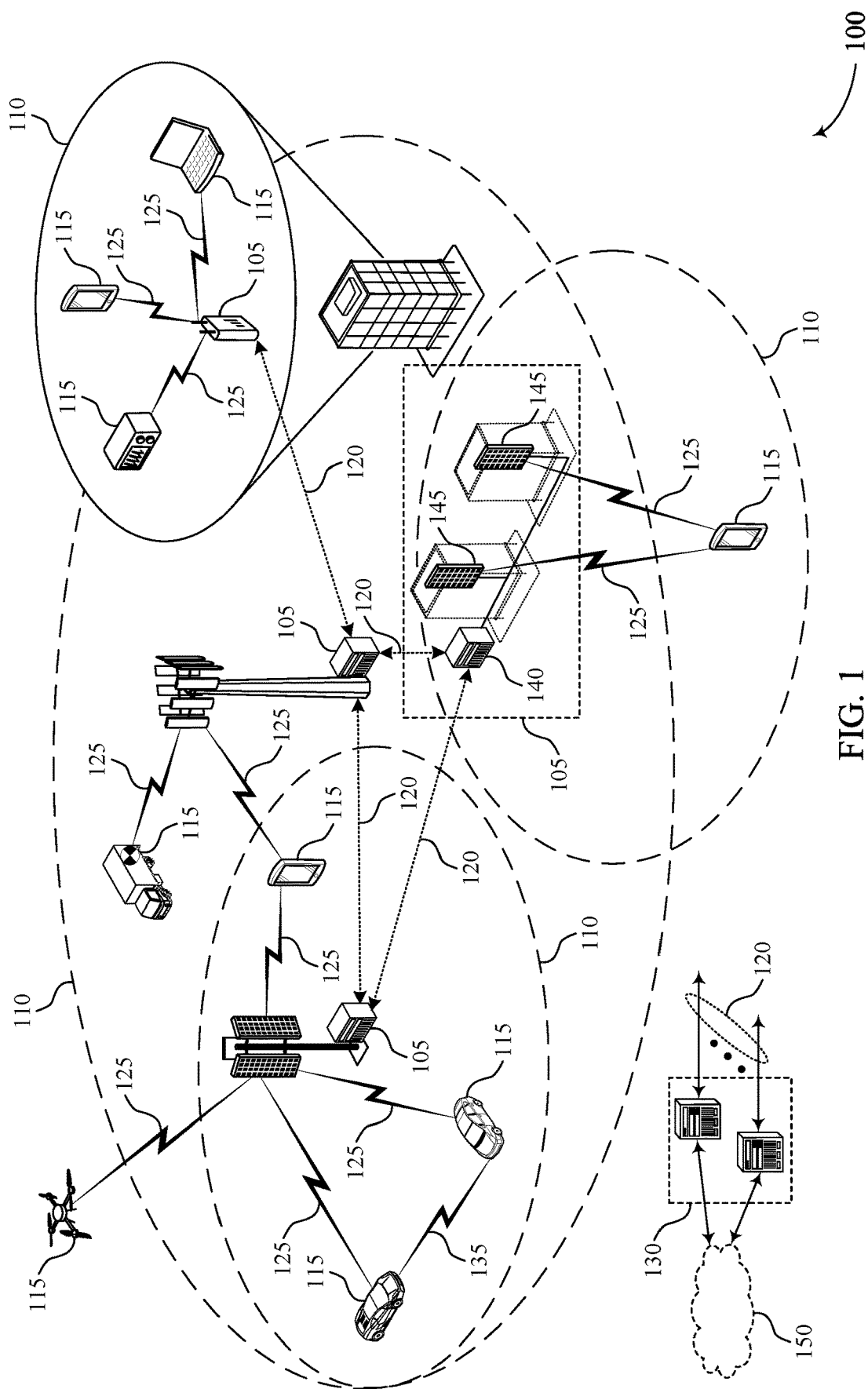
FIGS. 1 through 4 illustrate examples of wireless communications systems that support interference coordination region configuration in accordance with aspects of the present disclosure.

In some wireless communications systems, base stations may implement beamforming techniques for wireless communications. Depending on the locations of the base stations and the directions and/or widths of the communication beams, some beams from neighboring base stations may interfere with one another. During these beamforming communications, the link quality (e.g., measured using a signal-to-noise ratio (SNR), a signal-to-interference-plus-noise ratio (SINR), etc.) between a user equipment (UE) and its serving base station may vary (e.g., decrease) depending on a scheduling decision by a neighboring base station. The scheduling decision may include a transmission beam selection and/or a UE selection by the neighboring base station. For example, the serving base station and neighboring base station may both make scheduling decisions and communicate with UEs based on the decisions. If the selected communication beams are directed toward similar geographic areas at concurrent times, in at least partially overlapping frequency resources, or both, the transmissions on the selected beams may interfere with one another. In some cases, a level of interference (e.g., a high level of interference above some interference threshold) may be experienced by one or more UEs under the serving base station as a result of the scheduling decision made by a neighboring base station.

To mitigate unexpected interference, an interference coordination region within time and frequency resources may be configured by a centralized scheduler or by the base stations in a distributed manner. The interference coordination region may be configured based on long-term information for the base stations. In some examples, the interference coordination region may include a set of beam-avoidance sub-regions, a set of beam-preference sub-regions, or a combination thereof, and each sub-region may be associated with a beam index. A base station may identify the interference coordination region and may schedule a communication beam based on the interference coordination region. For example, the base station may prioritize scheduling a communication beam associated with a beam-preference region in the beam-preference region and may refrain from scheduling a communication beam associated with a beam-avoidance region in the beam-avoidance region. The base station may transmit a message to a UE using the scheduled communication beam. The beam-preference region of one base station may be paired with a beam-avoidance region of another base station to mitigate interference between the base stations. That is, if signals on a first communication beam for a first base station interfere with signals on a second communication beam for a second base station, a beam-avoidance region for the first communication beam may be configured for a same set of resources as a beam-preference region for the second communication beam, and vice versa.

In some cases, a first base station may schedule a transmission to a first UE in a beam-avoidance region using the communication beam associated with the beam-avoidance region. In such cases, a second UE receiving a scheduled message from a second base station in the corresponding beam-preference region using the communication beam associated with the beam-preference region may experience unexpected interference. To mitigate this interference, the second UE may transmit an indication of the interfering transmission to the first UE and may transmit a message to its serving base station (e.g., the second base station) that may include an indication of the first UE receiving signals that are interfering with the second UE. The second base station may modify a scheduled transmission to the second UE (e.g., in the beam-preference region) based on the interference information received from the second UE. For example, the second base station may reduce a modulation and coding scheme (MCS) index value for the scheduled transmission to improve the transmission reliability in the beam-preference region and overcome the interference.

Aspects of the disclosure are initially described in the context of wireless communications systems. Additional aspects are described with reference to a beamforming architecture and a process flow. Aspects of the disclosure are further illustrated by and described with reference to apparatus diagrams, system diagrams, and flowcharts that relate to interference coordination region configuration.

FIG. 1 illustrates an example of a wireless communications system 100 that supports interference coordination region configuration in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency (RF) spectrum resources having a defined physical layer structure for supporting communication links 125. For example, a carrier used for a communication link 125 may include a portion of a RF spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

Generally, the described techniques provide for mitigating unexpected interference between neighboring base stations 105. Some systems may implement joint scheduling amongst base stations 105 that interfere with one another's transmissions. Joint scheduling may be implemented by a centralized scheduler (e.g., an MME) that may schedule one or more base stations 105 and/or UEs 115 in the system. However, in some cases, this joint scheduling may rely on outdated information (e.g., causing scheduling latency) or use a large amount of over-the-air (OTA) signaling (e.g., causing a significant channel overhead. To reduce the overhead and scheduling latency, base stations 105 may instead use long-term information for interference coordination configuration. A centralized scheduler (e.g., a network entity) or a base station 105 may configure an interference coordination region of time and frequency resources. The interference coordination region may be configured based on long-term information exchange between base stations 105 that indicate historic trends of the network. For example, a base station 105 serving a coverage area 110 may commonly experience higher loading than another base station 105 serving a different coverage area 110. Accordingly, the base station 105 with higher loading may be configured with more interference coordination resources.

The interference coordination region may include one or both of a set of beam-avoidance regions or a set of beam-preference regions, and each sub-region may be associated with a beam index. The beam-avoidance region of one base station 105 may occupy the same or similar time and frequency resources as the beam-preference region of a neighboring base station 105. This pairing of regions may result in one base station 105 transmitting using a communication beam directed toward a geographic area that a neighboring base station 105 may be avoiding transmitting towards to reduce unexpected interference. A base station 105 may identify the interference coordination region and schedule a communication beam in the interference coordination region based on one or both of a beam-avoidance sub-region or a beam-preference sub-region. The base station 105 may transmit a message to a UE 115 in the interference coordination region on the scheduled communication beam.

Figure 2:
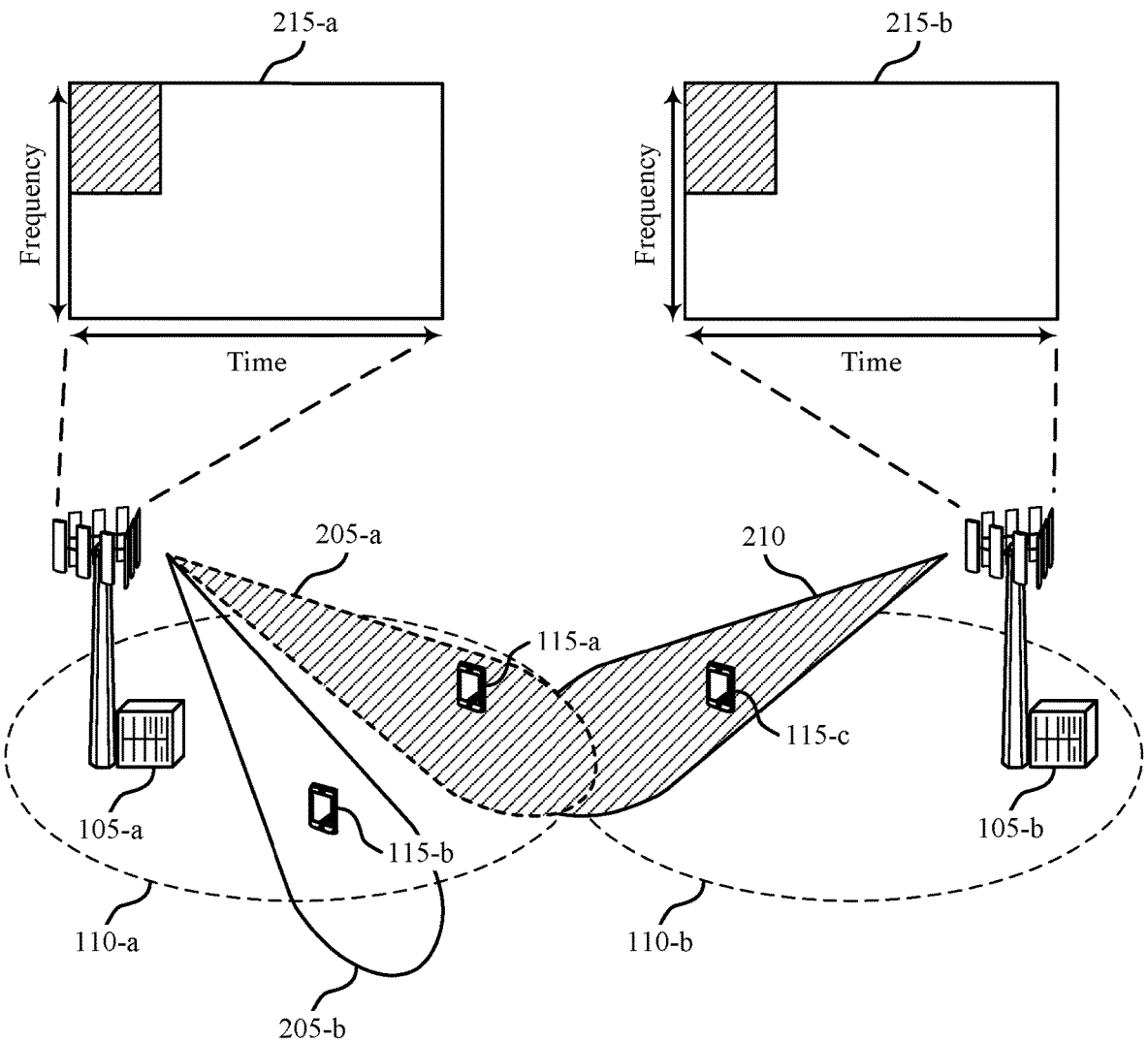

FIG. 2 illustrates an example of a wireless communications system 200 that supports interference coordination region configuration in accordance with aspects of the present disclosure. The wireless communications system 200 may include base stations 105-a and 105-b, and UEs 115-a, 115-b, and 115-c, which may be examples of base stations 105 and UEs 115 as described with reference to FIG. 1. Base station 105-a may serve a geographic coverage area 110-a and base station 105-b may serve a geographic coverage area 110-b. In some cases, base station 105-a, base station 105-b, or a combination thereof may implement an interference coordination region 220 for beamforming communications. For example, base station 105-a may configure an interference coordination region 220 to avoid interference with base station 105-b.

During beamforming communications, the link quality (e.g., measured based on a SNR, SINR, or some other metric) between a UE 115 and a serving base station 105 (e.g., base station 105-a) may vary depending on a scheduling decision for a neighboring base station 105 (e.g., base station 105-b). The scheduling decision may include a transmission beam selection (e.g., selecting a communication beam 210), a UE 115 selection (e.g., selecting UE 115-c), or both. In some cases, a level of interference (e.g., a high level of interference) may be experienced by UE 115-a as a result of scheduling decisions made by the neighboring base station 105. In one example, interference may result between signals transmitted on communication beams 205-a and 210. To mitigate or reduce such interference, base stations 105 may implement interference coordination using long-term information exchange. Long-term information may support a low signaling overhead, as the information may be transmitted on the scale of seconds, minutes, hours, or days, etc., rather than on the scale of TTIs, symbols, subframes, or frames, etc. Long-term information exchange may be based on historical data for the network. For example, the interference coordination between base stations 105 may be based on what most commonly occurs in the system, as opposed to what is currently occurring in the system.

In some cases, interference coordination may be configured by a centralized unit (e.g., an EME). For example, a centralized unit may receive signaling from one or more base stations 105 or UEs 115 that indicate interference between one or more beams between base stations 105-a and 105-b. The centralized unit may indicate an interference coordination region 220 to base stations 105-a and 105-b based on the indicated interference. In other examples, the centralized unit may determine interference coordination based on long-term information for the base stations 105, the UEs 115, or a combination thereof. In some other cases, interference coordination may be configured in a distributed manner by the base stations 105. For example, base station 105-a and base station 105-b may communicate via wired backhaul or OTA signals to schedule interference coordination based on long-term information exchange and/or historic network trends. Additionally or alternatively, UE 115-a may detect interference caused by signaling between base station 105-b and UE 115-c. UE 115-a may indicate the detected interference to base station 105-a and base station 105-a may communicate with base station 105-b to schedule interference coordination.

A resource region 215 may be a time and frequency region used by the base stations 105 to schedule beams and UEs 115. Base station 105-a may utilize resource region 215-a to schedule communication beams 205-a and 205-b and UEs 115-a and 115-b. Base station 105-b may utilize resource region 215-b to schedule communication beam 210 and UE 115-c. As part of interference coordination, base stations 105-a, 105-b, or both may implement an interference coordination region 220 in a resource region 215 (e.g., resource regions 215-a, 215-b, or a combination thereof).

A resource region 215 may be divided into multiple regions, such as a normal region 225 and an interference coordination region 220. The normal region 225 for base station 105-a may be available for scheduling of any communication beam and/or UE 115 served by base station 105-a. The normal region 225 for base station 105-b may be available for scheduling of any communication beam and/or UE 115 served by base station 105-b. The normal region 225 of resource region 215-a may be the same or different from the normal region 225 of resource region 215-b. The communications scheduled for the normal region 225 may include uplink transmissions, downlink transmissions, sidelink transmissions, or any combinations thereof.

A base station 105 may be configured to refrain from transmitting on one or more communication beams in the interference coordination region 220. As such, a neighboring base station 105 may be able to predict a low level of interference in certain areas of its geographic coverage area 110 and may schedule transmissions using beams that are directed toward those areas of the geographic coverage area 110. For example, base station 105-b may have information to transmit to UE 115-c and may prioritize scheduling the transmission in an interference coordination region 220 associated with communication beam 210. Base station 105-a may avoid communicating with UE 115-a on communication beam 205-a in the resources base station 105-b is utilizing to transmit to UE 115-c (e.g., the interference coordination region 220 resources). Base station 105-a may instead communicate with UE 115-a during a normal region 225.

The interference coordination region 220 may be determined based on long-term information of UE 115 distribution within a cell. In some examples, the long-term information may include one or more beam indices corresponding to one or more communication beams of a serving base station 105, a neighboring base station 105, or a combination thereof. Additionally or alternatively, the long-term information may include data traffic type information, UE 115 priority information, link quality information, interfering beam indices from neighboring base stations 105, etc. The long-term information for a base station 105 may be tracked by that base station 105 and periodically or aperiodically reported (e.g., to neighboring base stations 105, or to a centralized unit). This long-term information may indicate pairs of beams that may result in interfering transmissions (e.g., communication beam 205-a for base station 105-a and communication beam 210 for base station 105-b), typical loading for a base station 105 or a beam, or some combination of this information. The interference coordination region 220 between base stations 105 may be configured based on the long-term information. In some cases, the configuration may allocate more resources for base stations 105 and/or beams with higher loading, base stations 105 and/or beams serving higher priority UEs 115, or both based on the long-term information.

The interference coordination region 220 may be common for all base stations 105 or different for each pair of base stations 105. In one example, base stations 105-a and 105-b may have common interference coordination regions 220 such that the interference coordination regions 220 occur during the same time and frequency resources for base station 105-a and base station 105-b. The interference coordination region 220 may be periodically repeated in time. For example, the interference coordination region 220 may be configured such that the interference coordination region 220 may repeat according to a predetermined pattern. This repetition may be the same or different for each pair of neighboring base stations 105 with interference coordination.

In some cases, a resource region 215 may include more than one interference coordination region 220. More than one interference coordination region 220 may be allocated for one or more beam pairs of base stations 105-a and 105-b. In the case where there is more than one interference coordination region 220, each may be independently FDMed, TDMed, or a combination thereof. The amount of traffic experienced by a geographic coverage area 110 may impact the size of an interference coordination region. In some cases, a base station 105 that experiences higher traffic and loading may allocate or be allocated a larger interference coordination region 220.

Figure 3:
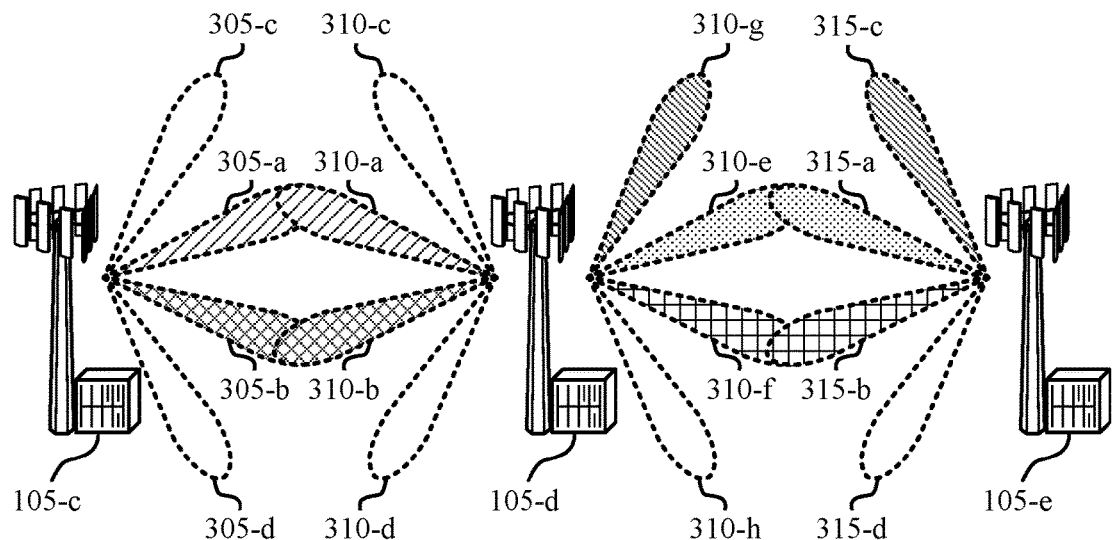
Figure 3:
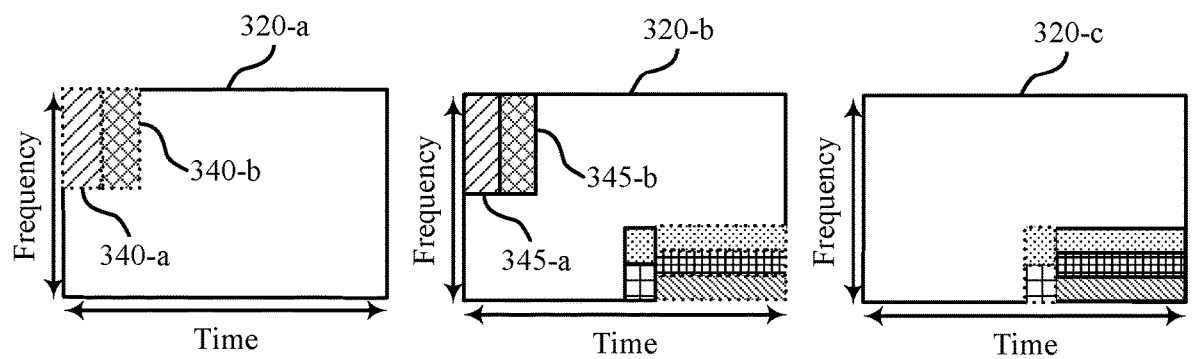
Figure 3:
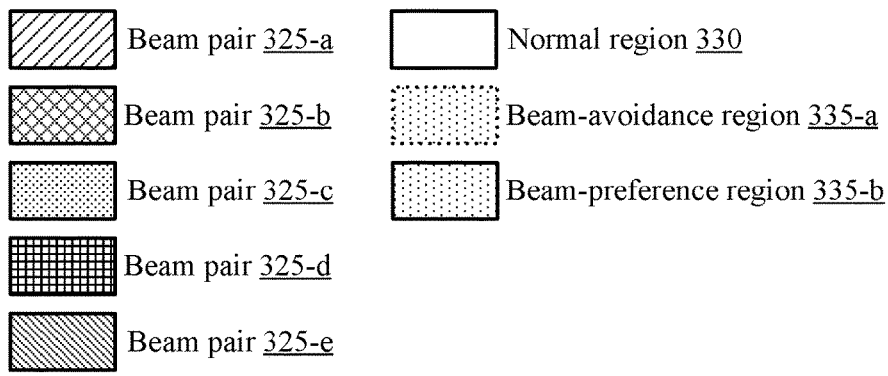

FIG. 3 illustrates an example of a wireless communications system 300 that supports interference coordination region configuration in accordance with aspects of the present disclosure. The wireless communications system 300 may include base stations 105-c, 105-d, and 105-e, which may be examples of base stations 105 as described with reference to FIGS. 1 and 2. In some cases, base stations 105-c, 105-d, 105-e, or a combination thereof may implement interference coordination regions for beamforming communications.

Base stations 105-c, 105-d, 105-e, or a combination thereof may receive a region pattern from a centralized unit (e.g., an MME) or may configure a region pattern by exchanging messages among base stations 105. In one example, base station 105-e may detect interference caused by base station 105-d and base station 105-e may transmit a message to base station 105-d indicating a preferred coordination region that mitigates or avoids interference between base stations 105-d and 105-e. In another example, base station 105-c may determine that base station 105-c experiences relatively low loading and may indicate to base station 105-d that interference coordination regions between base stations 105-c and 105-d may be reduced (or may prioritize base station 105-d transmissions).

The configuration and indication of a region pattern may occur at regular time intervals (e.g., every n-seconds, n-minutes, n-hours, n-days, or some other time interval), according to a schedule, or based on one or more configuration triggers. The region pattern may include information indicating multiple sub-regions, such as one or more normal regions 330 and/or one or more interference coordination regions. An interference coordination region may be divided into one or more beam-avoidance regions 335-a, one or more beam-preference regions 335-b, or both. Each sub-region may be associated with a beam index (e.g., indicating a specific communication beam of a beam pair 325). Between neighboring base stations 105, the beam-avoidance region 335-a of one base station 105 may be paired with the beam-preference region 335-b of the neighboring base station 105 for an interfering beam pair 325. Each base station 105 may schedule a beam for communication with a UE 115 based on the region pattern.

Within the region pattern, the normal region 330 may indicate time and frequency resources that may be utilized for scheduling communications (e.g., downlink transmissions, uplink transmissions, sidelink transmissions, or any other communications) for any UE 115 or communication beam without considering intercell interference. In contrast, an interference coordination region may indicate time and frequency resources that may be utilized for specifically scheduling UEs 115 on communication beams such that intercell interference is mitigated due to a beam-avoidance region 335-a and beam-preference region 335-b pairing. In a beam-preference region 335-b, a base station 105 may select any communication beam for communication. However, the beam-preference region 335-b may be associated with a particular beam index, and the base station 105 may prioritize scheduling transmissions using the communication beam corresponding to that beam index (e.g., the base station 105 may prioritize scheduling UEs 115 corresponding to this prioritized communication beam). For example, the base station 105 may estimate that the messages transmitted on the preferred beam may experience reduced interference in this beam-preference region 335-b, resulting in more reliable transmissions. As such, the base station 105 may transmit using a higher MCS value (e.g., corresponding to a higher coding rate) in this beam-preference region 335-b than in the normal region 330, such that transmitting a message using the preferred beam in the beam-preference region 335-b may reduce the overhead on the channel (as compared to a normal region transmission or transmitting using a beam not preferred in the beam-preference region 335-b). A base station 105 may assign UEs 115 served by the communication beam associated with the beam-preference region 335-b.

In some cases, within the beam-preference region 335-b, the base station 105 may give priority to UEs 115 that are experiencing interference or with higher priority data traffic. Remaining resources after scheduling the higher priority UEs 115 may be used to schedule lower priority UEs 115. If the base station 105 does not have information pending for transmission to any UEs 115 served by the communication beam associated with the beam-preference region 335-b, the base station 105 may schedule any UE 115 for communication in this region.

The beam-avoidance region 335-a may be associated with a particular communication beam and may indicate resources in which base station 105 is to refrain from scheduling communications (e.g., transmissions) using that communication beam. By refraining from transmitting on the communication beam associated with the beam-avoidance region 335-a, the base station 105 may avoid interfering with the neighboring base station 105 (e.g., if the neighboring base station 105 transmits using particular beams, such as a preferred beam). The base station 105 may transmit on other communication beams in the beam-avoidance region 335-*a* (e.g., other than the communication beam associated with the beam-avoidance region 335-*a*) such that the throughput of the base station 105 may not be reduced.

In one example, base station 105-*c* and base station 105-*d* may experience interference with one another. For example, a UE 115 served by base station 105-*c* and receiving a message from base station 105-*c* may experience interference due to a transmission by base station 105-*d*, reducing the likelihood of successful reception of the message at the UE 115. Base station 105-*c* may be assigned resource region 320-*a*, base station 105-*d* may be assigned resource region 320-*b*, and base station 105-*e* may be assigned resource region 320-*c*. Resource region 320-*a* may indicate to base station 105-*c* that communication beam 305-*a* of beam pair 325-*a* and communication beam 305-*b* of beam pair 325-*b* are included in one or more beam-avoidance regions 335-*a*. Base station 105-*c* may refrain from transmitting to a UE 115 on communication beam 305-*a* in beam-avoidance region 340-*a*. Additionally or alternatively, base station 105-*c* may refrain from transmitting to a UE 115 on communication beam 305-*b* in beam-avoidance region 340-*b*.

In some cases, base station 105-*c* may not be allocated a beam-preference region 335-*b* based on long-term information. For example, base station 105-*c* may commonly experience lower loading than base station 105-*d*, base station 105-*e*, or a combination thereof. Base station 105-*c* may schedule communications on any communication beam 305 in the normal region 330. In some cases, base station 105-*c* may schedule a UE 115 for communication within a beam-avoidance region 335-*a* associated with a beam pair 325-*a*, 325-*b*, or both using communication beam 305-*a*, 305-*b*, or both. Base station 105-*c* may schedule a UE 115 during beam-avoidance region 335-*a* based on a UE priority or latency threshold that may not be met if the UE 115 is scheduled in a different resource region. Additionally or alternatively, base station 105-*c* may schedule a UE 115 during a beam-avoidance region 335-*a* based on resources in the normal region 330 being occupied.

In a second example, base station 105-*d* may cause interference, identify interference, or a combination thereof with base station 105-*c*, base station 105-*e*, or both. To mitigate such interference, base station 105-*d* may be assigned time and frequency resources according to resource region 320-*b*. Resource region 320-*b* may be configured with beam-avoidance regions 335-*a*, beam-preference regions 335-*b*, or a combination thereof. In one example, base station 105-*d* may be allocated a beam-preference region 335-*b* for communication beam 310-*a* of beam pair 325-*a*. During the beam-preference region, base station 105-*d* may transmit to a UE 115 using communication beam 310-*a* without interference from base station 105-*c* using communication beam 305-*a* because beam-preference region 335-*b* may be paired with the beam-avoidance region 335-*a* for communication beam 305-*a* of beam pair 325-*a*. Paired beam-preference regions 335-*a* and beam-avoidance regions 335-*b* may include the same or similar time and frequency resources such that transmission on one beam will occur when there is no transmission on the interfering beam, resulting in minimal interference experienced by the transmitting beam. For example, beam-avoidance region 340-*a* may be paired with beam-preference region 345-*a*, and beam-avoidance region 340-*b* may be paired with beam-preference region 345-*b*.

Additionally or alternatively, base station 105-*d* may be allocated a beam-preference region 335-*b* for communication beam 310-*b* of beam pair 325-*b*. During the beam-preference region, base station 105-*d* may transmit to a UE 115 on communication beam 310-*b* without interference from base station 105-*c* using communication beam 305-*b* because beam-preference region 345-*b* may be paired with the beam-avoidance region 340-*b* for communication beam 305-*b* of beam pair 325-*b*. Base station 105-*d* may implement a predefined MCS value (e.g., MCS index) for various levels of interference, where the levels of interference may correspond to a normal region 330, a beam-avoidance region 335-*a*, a beam-preference region 335-*b*, or a combination thereof. Base station 105-*d* may operate at a high MCS level when transmitting in a beam-preference region 335-*b* because interference is mitigated (e.g., due to the paired beam-avoidance region 335-*a* at base station 105-*c*). In some cases, the MCS level used for transmissions in a beam-preference region 335-*b* may be higher than an MCS level used for transmissions in a normal region 330.

Additionally or alternatively, to avoid interference between base station 105-*d* and 105-*e*, resource region 320-*b* associated with base station 105-*d* and resource region 320-*c* associated with base station 105-*e* may indicate beam-avoidance regions 335-*a* and beam-preference regions 335-*b*. For example, resource region 320-*b* may indicate beam-avoidance regions 335-*a* for beams pairs 325-*c*, 325-*d*, and 325-*e* that specify beams 310-*e*, 310-*f*, and 310-*g*, respectively. Base station 105-*d* may avoid transmitting to UEs 115 in the indicated beam-avoidance regions 335-*a* using the associated communication beams 310 to avoid. Additionally or alternatively, resource region 320-*b* may indicate beam-preference regions 335-*b* allocated for beam pairs 325-*c* and 325-*d* for beams 310-*e* and 310-*f*, respectively. Base station 105-*d* may prioritize scheduling UEs 115 using the associated beams in the beam-preference regions 335-*b*. In some implementations, a beam-preference region 335-*b* may not be designated for communication beam 310-*g* for base station 105-*d* based on long-term information. Base station 105-*d* may transmit on communication beams 310-*g*, 310-*h*, or a combination thereof in the normal region 330, but may not prioritize scheduling communications with these communication beams 310 in any beam-preference region 335-*b*.

Resource region 320-*c* may indicate beam-avoidance regions 335-*a* for beam pairs 325-*c* and 325-*d* for beams 315-*a* and 315-*b*, respectively. Additionally or alternatively, resources region 320-*c* may indicate beam-preference regions 335-*b* for beam pairs 325-*c*, 325-*d*, and 325-*e*, indicating beams 315-*a*, 315-*b*, and 315-*c*, respectively. The beam-avoidance regions 335-*a* for beam pairs 325-*c* and 325-*d* at base station 105-*e* may be configured for the same or similar time and frequency resources as beam-preference regions 335-*b* for beam pairs 325-*c* and 325-*d* at base station 105-*d*. The beam-preference regions 335-*b* for beam pairs 325-*c*, 325-*d*, and 325-*e* at base station 105-*e* may be configured for the same or similar time and frequency resources as the beam-avoidance region 335-*a* for beam pairs 325-*c*, 325-*d*, and 325-*e* at base station 105-*d*.

The amount of traffic experienced by a cell may impact the size of an interference coordination region. In some cases, a base station 105 that experiences higher traffic and loading may allocate or be allocated a larger interference coordination region. Accordingly, the interference coordination region between a pair of base stations 105 may be smaller than the interference coordination region between another pair of base stations 105. In one example, base station 105-*e* may commonly serve more UEs 115 than base stations 105-*c* or 105-*d*. In such cases, base station 105-*e* may be allocated more time and frequency resources within the interference coordination region than base stations 105-c or 105-d. For example, base station 105-e may be allocated beam-preference regions 335-b for beams 315-a, 315-b, and 315-c. The interference coordination region (or the beam-preference regions 335-b) for beams 315-a, 315-b, and 315-c may be larger than the interference coordination region (or the beam-preference regions 335-b) for other beams at other base stations 105 due to the higher loading of base station 105-e. Furthermore, non-neighboring base stations 105 (e.g., base stations 105 that do not interfere with each other's transmissions) may not configure interference coordination regions between each other. For example, base station 105-c and base station 105-e may not share interference coordination resources.

In some implementations, a base station 105 may schedule a transmission to a UE 115 using a particular communication beam in a normal region 330 or in a beam-avoidance region associated with a different communication beam. For example, base station 105-c may schedule a UE 115 on communication beam 305-a during beam-avoidance region 340-b for beam pair 325-b. However, in some other implementations, base station 105-c may schedule a transmission to a UE 115 using communication beam 305-a in beam-avoidance region 340-a for beam pair 325-a. Base station 105-d may implement exception handling as described herein with reference to FIG. 4 to manage implementations where this occurs (e.g., if a base station 105 does not refrain from using the communication beam associated with a beam-avoidance region 335-a in the beam-avoidance region 335-a).

Figure 4:
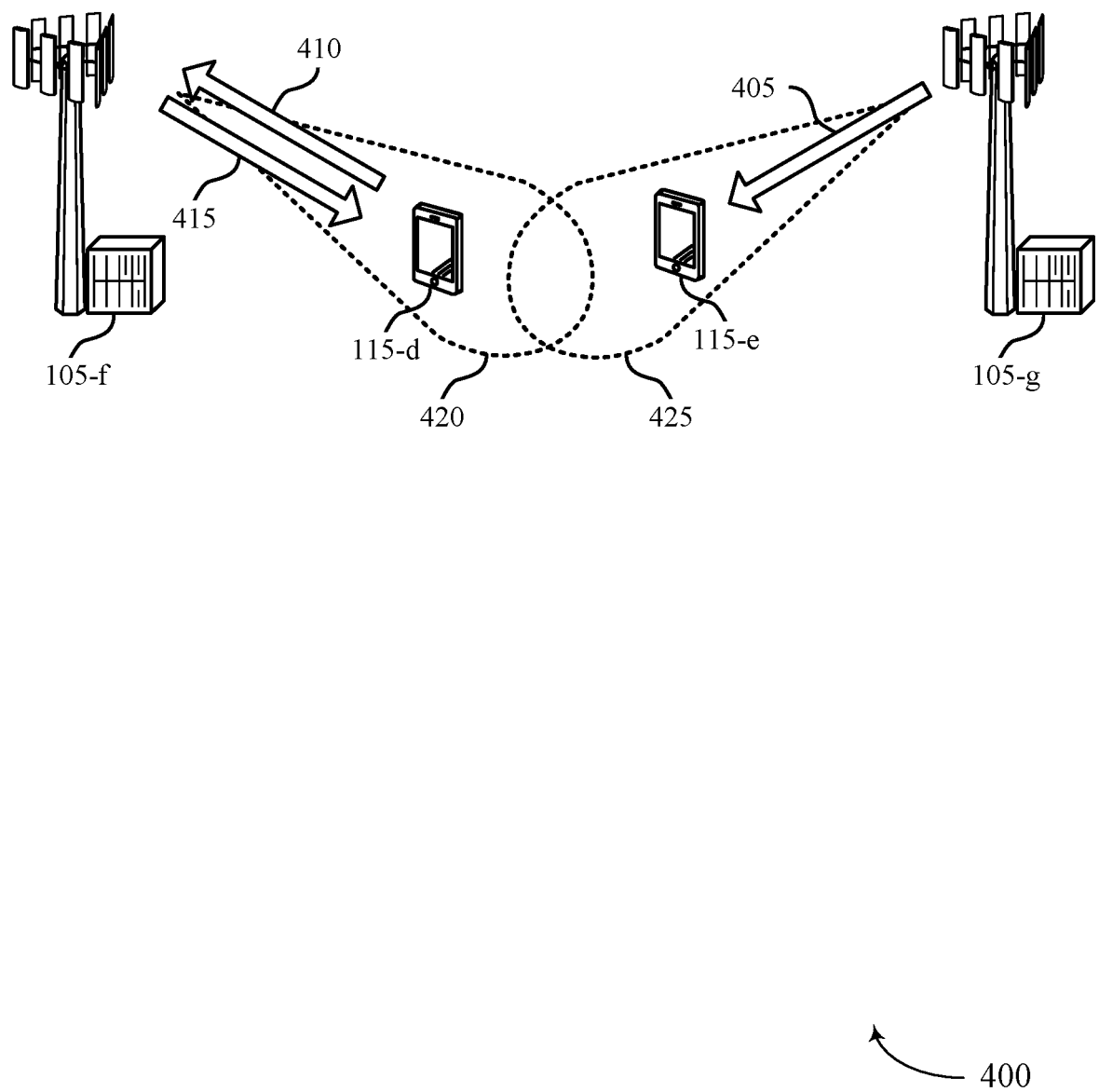

FIG. 4 illustrates an example of a wireless communications system 400 that supports interference coordination region configuration in accordance with aspects of the present disclosure. The wireless communications system 400 may include base stations 105-f and 105-g, and UEs 115-d and 115-e, which may be examples of base stations 105 and UEs 115 as described with reference to FIGS. 1 through 3. In some cases, base station 105-f, base station 105-g, or a combination thereof may implement an interference coordination region for beamforming communications. For example, base station 105-f may configure an interference coordination region to avoid interference with base station 105-g.

In some cases, a base station 105 may schedule a UE 115 within a beam-avoidance region using the beam associated with the beam-avoidance region. The base station 105 may schedule a UE 115 during the beam-avoidance region based on a UE priority that may not be met if the UE 115 is scheduled in a different resource region. Additionally or alternatively, the base station may schedule the UE 115 during the beam-avoidance region based on resources in other regions (e.g., the normal region, other beam-avoidance and/or beam-preference regions, or any other region) being occupied. Additionally or alternatively, the decision to schedule a UE 115 in a beam-avoidance region may depend on a UE data traffic type, a quality of service (QoS) level, a UE link quality, a data buffer status, etc. For example, base station 105-g may schedule and transmit a signal 405 to UE 115-e using communication beam 425 in a beam-avoidance region associated with communication beam 425. This beam-avoidance region may be paired with a beam-preference region associated with communication beam 420 and configured at base station 105-f. UE 115-d may detect unexpected interference from transmission 405 being transmitted to UE 115-e. UE 115-d may determine the existence of the interfering UE 115 (e.g., UE 115-e). In some cases, the transmission 405 may be an example of a physical downlink shared channel (PDSCH) transmission.

To mitigate unexpected interference, UE 115-e may transmit an OTA signal in a preconfigured region prior to transmission 405, and UE 115-d may monitor for the OTA signal in the preconfigured region. The location of the resources assigned for the preconfigured region may be shared by both base stations 105-f and 105-g. The OTA signal may be transmitted as a message containing downlink control information (DCI), medium access control (MAC) information (e.g., a MAC control element (CE)), or some similar message. In some examples, the OTA signal may be an example of a reference signal (e.g., a CSI-RS). Additionally or alternatively, UE 115-d may determine the existence of interfering UE 115-e based on receiving the transmission 405. In some examples, UE 115-d may monitor for the one or more demodulation reference signals (DMRSs) and may estimate the interference power of the transmission 405 based on the DMRSs.

UE 115-d may transmit a signal 410 to base station 105-f to indicate the existence of interfering UE 115-e. Additionally or alternatively, signal 410 may indicate interference power, link quality, interfering beam indices from neighboring base station 105-g, or some combination of this or other information related to the interfering signal. Base station 105-f may use this information for rate control. For example, base station 105-f may use the information for rate control by modifying an MCS value for transmission in the beam-preference region. Base station 105-f may default to using a relatively high MCS index (e.g., a maximum MCS index used by base station 105-f or an MCS index above a threshold MCS value) in a beam-preference region based on estimating minimal interference on the channel (e.g., due to the matching beam-avoidance region configured at base station 105-g). However, using the high MCS index for transmissions experiencing interference may result in lost data. In some implementations, base station 105-f may adjust the MCS index based on the detected interference. For example, to limit the loss of data due to a high MCS index being used for a transmission experiencing interference, base station 105-f may reduce the MCS index that base station 105-f uses to transmit to UE 115-d over communication beam 420 in the beam-preference region (e.g., if base station 105-g is not refraining from transmitting using communication beam 425 associated with the corresponding beam-avoidance region). The base station 105-f may maintain separate outer loop rate control parameters (e.g., the MCS index) for normal regions, beam-avoidance regions, and other beam-preference regions.

Figure 5:
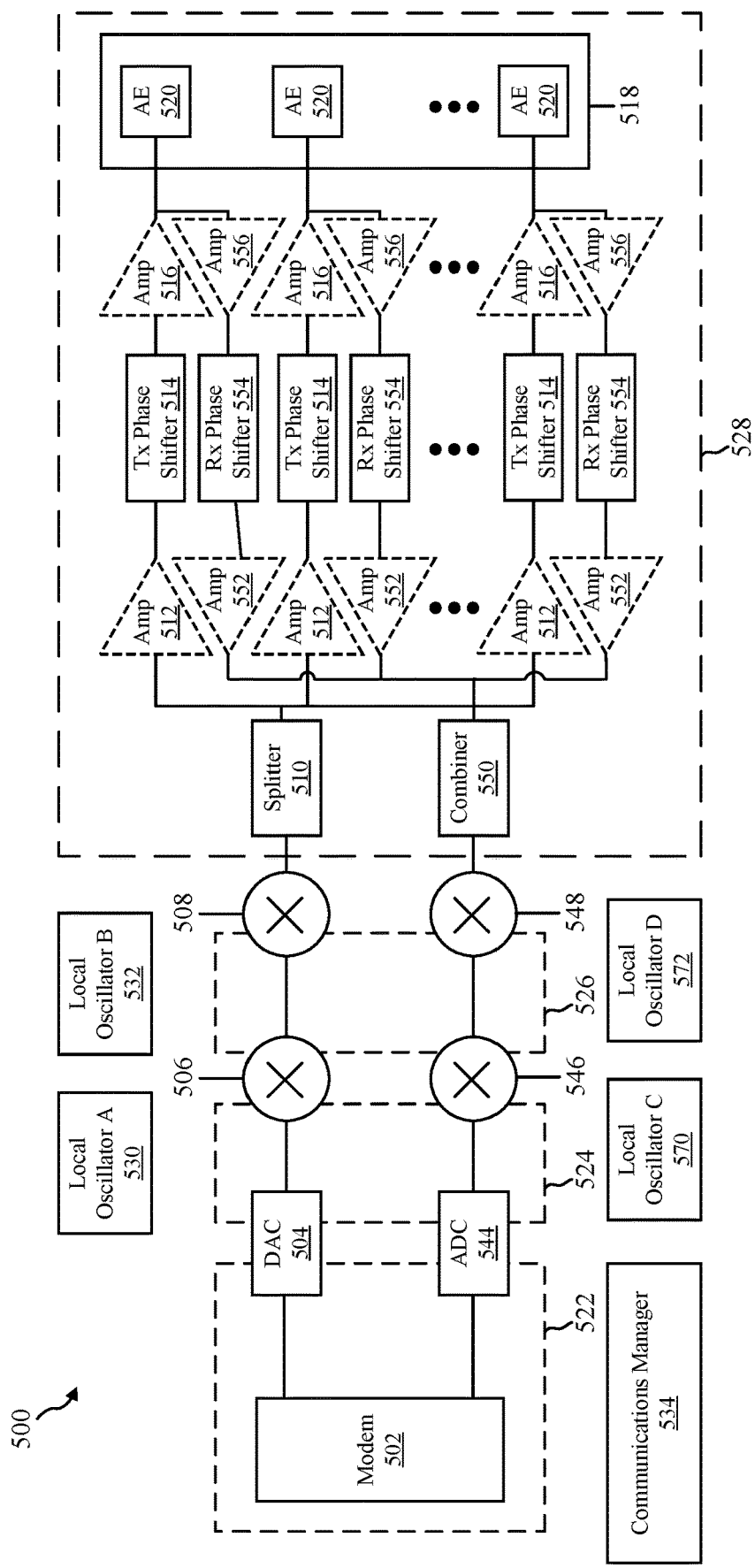
FIG. 5 illustrates an example of an architecture that supports interference coordination region configuration in accordance with aspects of the present disclosure.

FIG. 5 illustrates an example of an architecture 500 that supports interference coordination region configuration in accordance with aspects of the present disclosure. In some examples, architecture 500 may implement aspects of the wireless communications systems described with reference to FIGS. 1 through 4. In some aspects, architecture 500 may be an example of a transmitting device (e.g., a first wireless device) and/or a receiving device (e.g., a second wireless device) as described herein.

Broadly, FIG. 5 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 500 includes a modem (modulator/demodulator) 502, a digital to analog converter (DAC) 504, a first mixer 506, a second mixer 508, and a splitter 510. The architecture 500 also includes a plurality of first amplifiers 512, a plurality of phase shifters 514, a plurality of second amplifiers 516, and an antenna array 518 that includes a plurality of antenna elements 520. Transmission lines or other waveguides, wires, traces, or the like are shown connecting the various components to illustrate how signals to be transmitted may travel between components. Boxes 522, 524, 526, and 528 indicate regions in the architecture 500 in which different types of signals travel or are processed. Specifically, box 522 indicates a region in which digital baseband signals travel or are processed, box 524 indicates a region in which analog baseband signals travel or are processed, box 526 indicates a region in which analog intermediate frequency (IF) signals travel or are processed, and box 528 indicates a region in which analog RF signals travel or are processed. The architecture also includes a local oscillator A 530, a local oscillator B 532, and a communications manager 534.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the communications manager 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a plurality of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some implementations. In one implementation, both the first amplifier 512 and second amplifier 514 are present. In another, neither the first amplifier 512 nor the second amplifier 514 is present. In other implementations, one of the two amplifiers 512, 514 is present but not the other. By way of example, if the splitter 510 is an active splitter, the first amplifier 512 may not be used. By way of further example, if the phase shifter 514 is an active phase shifter that can provide a gain, the second amplifier 516 might not be used. The amplifiers 512 and 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512 and 516 may be controlled independently (e.g., by the modem 502 or communications manager 534) to provide independent control of the gain for each antenna element 520. For example, the modem 502 and/or the communications manager 534 may have at least one control line connected to each of the splitter 510, first amplifiers 512, phase shifters 514, and/or second amplifiers 516 which may be used to configure a gain to provide a desired amount of gain for each component and thus each antenna element 520.

The phase shifter 514 may provide a configurable phase shift or phase offset to a corresponding RF signal to be transmitted. The phase shifter 514 could be a passive phase shifter not directly connected to a power supply. Passive phase shifters might introduce some insertion loss. The second amplifier 516 could boost the signal to compensate for the insertion loss. The phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. The modem 502 and/or the communications manager 534 may have at least one control line connected to each of the phase shifters 514 and which may be used to configure the phase shifters 514 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 518, e.g., for TDD operations. The first amplifier 556 may be connected to different antenna arrays 518. The boosted RF signal is input into one or more of phase shifter 554 to provide a configurable phase shift or phase offset for the corresponding received RF signal. The phase shifter 554 may be an active phase shifter or a passive phase shifter. The settings of the phase shifters 554 are independent, meaning that each can be set to provide a desired amount of phase shift or the same amount of phase shift or some other configuration. The modem 502 and/or the communications manager 534 may have at least one control line connected to each of the phase shifters 554 and which may be used to configure the phase shifters 554 to provide a desired amount of phase shift or phase offset between antenna elements 520.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552 or 556 is present but not the other.

In the illustrated architecture 500, signals output by the phase shifters 554 (via the amplifiers 552 when present) are combined in combiner 550. The combiner 550 in architecture 500 combines the RF signal into a signal, as denoted by its presence in box 528. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, combiner 550 may provide a different (e.g., configurable) amount of gain for each input signal so that the input signals have the same magnitude when they are combined. When combiner 550 is an active combiner, combiner 550 may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to analog signals. The analog signals output from ADC 544 is input to modem 502 for baseband processing, e.g., decoding, de-interleaving, etc.

The architecture 500 is given by way of example only to illustrate an architecture for transmitting and/or receiving signals. It will be understood that the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although only a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters, and other components may be located in different signal type areas (e.g., different ones of the boxes 522, 524, 526, and 528) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512 and/or 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512 and 516. By way of another example, a phase shift may be implemented by the second mixer 508 to obviate the need for a separate phase shifter 514. This technique is sometimes called local oscillator phase shifting. In one implementation of this configuration, there may be a plurality of IF to RF mixers (e.g., for each antenna element chain) within the second mixer 508 and the local oscillator B 532 may supply different local oscillator signals (with different phase offsets) to each IF to RF mixer.

The modem 502 and/or the communications manager 534 may control one or more of the other components to select one or more antenna elements 520 and/or to form beams (e.g., communication beams, such as transmit beams) for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512 and/or 516 of the plurality of signals relative to each other.

The communications manager 534 (e.g., if implemented at a base station 105) may configure a set of resources as an interference coordination region including one or both of a set of beam-avoidance sub-regions or a set of beam-preference sub-regions between devices (e.g., base stations 105) and may schedule a communication beam for communication in the interference coordination region based on one or more of a beam-avoidance sub-region of the set of beam-avoidance sub-regions or a beam-preference sub-region of the set of beam-preference sub-regions. The communications manager 534 may transmit a message to a UE 115 in the interference coordination region using the scheduled communication beam. The communications manager 534 (e.g., if implemented at a UE 115) may identify a scheduled transmission from a serving base station 105 to the UE 115 in a first cell using a communication beam in a beam-preference region for the communication beam and may receive an indication of a second transmission to a nearby UE 115 in a second cell different from the first cell that interferes with the scheduled transmission. The communications manager 534 may transmit, to the serving base station (e.g., using a communication beam, such as a transmit beam), an indication of the nearby UE 115 based on the second transmission that interferes with the scheduled transmission and may receive, from the serving base station 105 (e.g., also using a communication beam, such as a receive beam), the scheduled transmission modified based on the indication of the second UE 115. The communications manager 534 may be located partially or fully within one or more other components of the architecture 500. For example, the communications manager 534 may be located within the modem 502 in at least one implementation.

Figure 6:
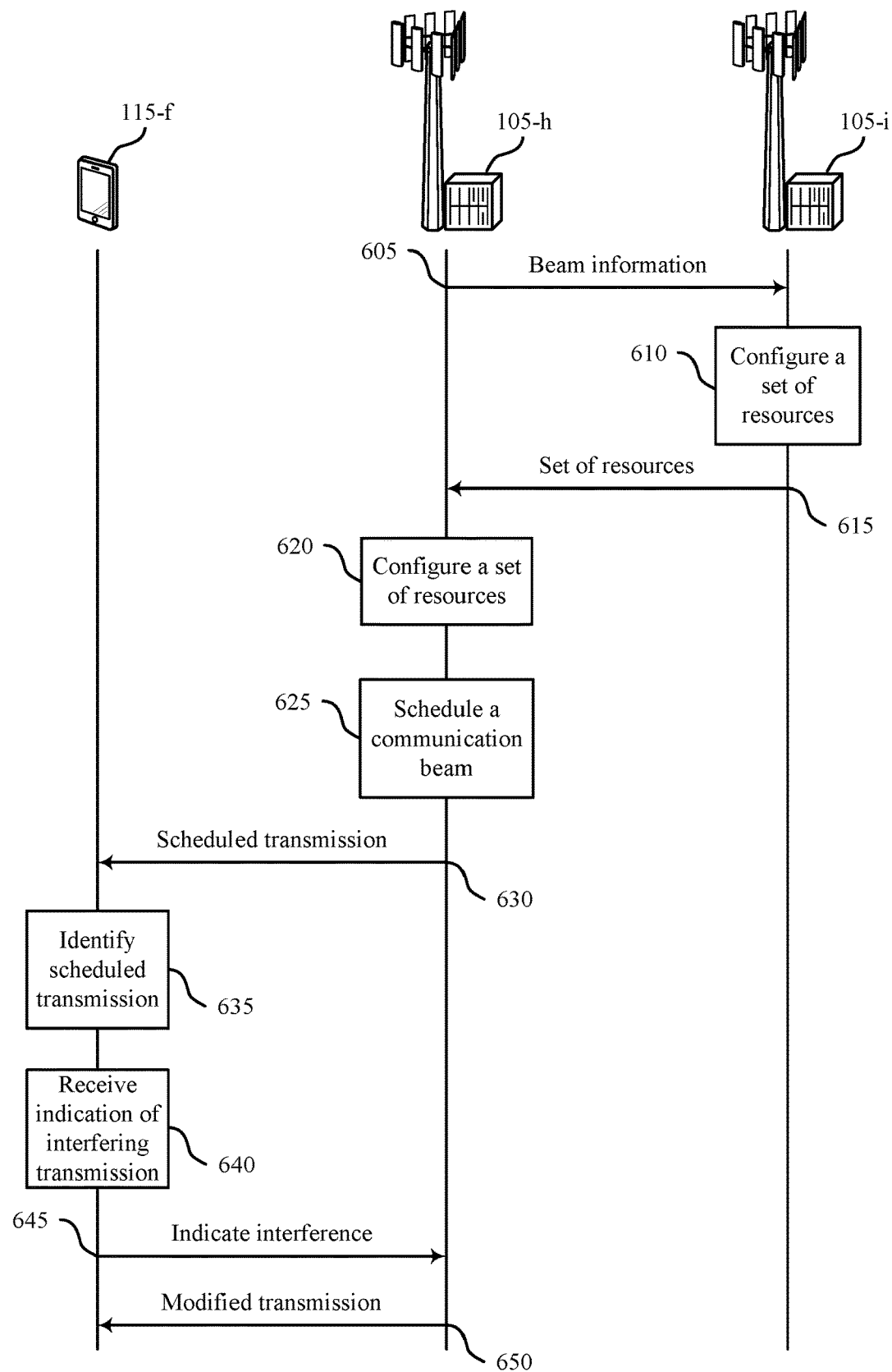
FIG. 6 illustrates an example of a process flow that supports interference coordination region configuration in accordance with aspects of the present disclosure.

FIG. 6 illustrates an example of a process flow 600 that supports interference coordination region configuration in accordance with aspects of the present disclosure. The process flow 600 may illustrate an example interference coordination scheme. For example, base station 105-h may configure an interference coordination region based on long-term information to transmit scheduled signals to UE 115-f. Base stations 105-h and 105-i and UE 115-f may be examples of the corresponding wireless devices described with reference to FIGS. 1 through 4. In some cases, instead of base station 105-h configuring the interference coordination scheme to reduce unexpected interference, a different type of wireless device (e.g., an MME) may configure an interference coordination scheme. Alternative examples of the following may be implemented, where some steps are performed in a different order than described or are not performed at all. In some cases, steps may include additional features not mentioned below, or further steps may be added.

At 605, base station 105-i may receive communication beam information for base station 105-h. In some cases, base station 105-h may additionally receive beam information for base station 105-i (e.g., in a long-term information exchange). Additionally or alternatively, the base stations 105 may transmit the beam information to a centralized unit (e.g., an MME).

At 610, base station 105-i may configure a set of resources as an interference coordination region between base station 105-h and base station 105-i based on the communication beam information for the base station 105-h. Alternatively, a centralized unit or base station 105-h may configure the interference coordination region for the base stations 105. In some cases, the interference coordination region may be further based on the communication beam information for base station 105-i. The interference coordination region may include one or more of a set of beam-avoidance sub-regions, a set of beam-preference sub-regions, or a set of normal regions. At 615, base station 105-i (or a centralized scheduler) may transmit an indication of the set of resources configured as the interference coordination region to base station 105-h.

At 620, base station 105-h may configure a set of resources as an interference coordination region including one or both of a set of beam-avoidance sub-regions or a set of beam-preference sub-regions between base station 105-h and base station 105-i. Base station 105-h may configure the set of resources based on the set of resources received from base station 105-i, or based on information received from a centralized unit, or based on a combination thereof. In some cases, the configuration of the set of resources as the interference coordination region is common for each base station 105.

At 625, base station 105-h may schedule a communication beam for communication in the interference coordination region based on one or both of a beam-avoidance sub-region of the set of beam-avoidance sub-regions or a beam-preference sub-region of the set of beam-preference sub-regions. In some cases, base station 105-h may determine a first communication beam associated with a beam-preference sub-region of the interference coordination region and schedule the first communication beam for communication in the beam-preference sub-region of the interference coordination region. In some of these cases, base station 105-h may select a first MCS index for transmission in the beam-preference sub-region of the interference coordination region that is greater than a second MCS index for transmission in a second set of resources for communication. In some other cases, base station 105-h may determine a second communication beam associated with a beam-avoidance sub-region of the interference coordination region and refrain from scheduling the second communication beam for communication in the beam-avoidance sub-region of the interference coordination region. In some cases, each beam-avoidance sub-region of the interference coordination region for base station 105-h may be configured as a respective beam-preference sub-region of the interference coordination region for base station 105-i. Additionally or alternatively, each beam-preference sub-region of the interference coordination region for base station 105-h may be configured as a respective beam-avoidance sub-region of the interference coordination region for base station 105-i. At 630, base station 105-h may transmit a message to UE 115-f in the interference coordination region using the scheduled communication beam.

In some cases, at 635, UE 115-f may identify a scheduled transmission from a serving base station (e.g., base station 105-h) intended for UE 115-f in a first cell using a communication beam in a beam-preference region for the communication beam. At 640, UE 115-f may receive an indication of a second transmission to a second UE 115 (not shown) different from UE 115-f in a second cell different from the first cell that interferes with the scheduled transmission intended for UE 115-f at 630. In some cases, receiving the indication of the second transmission to the second UE 115 may include receiving the second transmission in the beam-preference region (e.g., from neighboring base station 105-i). In some examples, UE 115-f may determine an interference power of the second transmission on the scheduled transmission based on a DMRS for the second transmission. In some other cases, the indication of the second transmission may be based on an OTA signal from the second UE 115. In some examples, UE 115-f may monitor for the OTA signal from the second UE 115 in a pre-configured resource region shared by the serving base station 105 (e.g., base station 105-h) and a second base station 105 (e.g., neighboring base station 105-i) serving the second UE 115.

At 645, UE 115-f may transmit, to the serving base station 105 (e.g., base station 105-h), an indication of the second UE 115 based on the second transmission that interferes with the scheduled transmission. In some cases, UE 115-f may transmit, to the serving base station 105 (e.g., base station 105-h), an indication of the interference power. The scheduled transmission may be further modified based on the indication of the interference power.

At 650, UE 115-f may receive, from the serving base station 105 (e.g., base station 105-h), the scheduled transmission modified based on the indication of the second UE 115. In some cases, the scheduled transmission may be modified with a decreased MCS index based on the indication of the second UE. In some examples (e.g., if the interference identification and signaling occurs prior to the scheduled transmission at 630), base station 105-h may modify the initial scheduled transmission at 630 based on the indication of the second UE 115.

Figure 7:
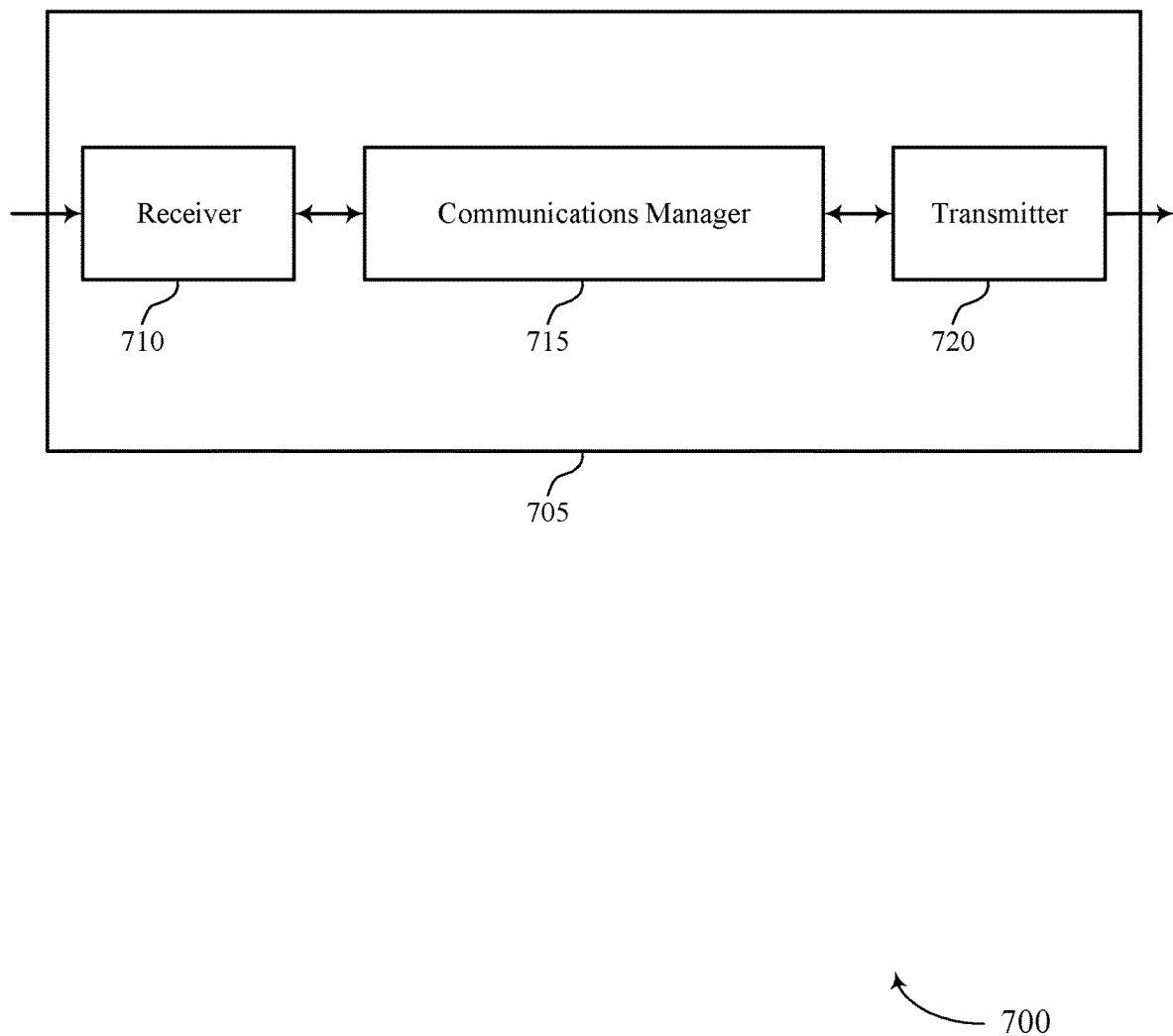
FIGS. 7 and 8 show block diagrams of devices that support interference coordination region configuration in accordance with aspects of the present disclosure.

FIG. 7 shows a block diagram 700 of a device 705 that supports interference coordination region configuration in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to interference coordination region configuration, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may be implemented at a first UE. The communications manager 715 may identify a scheduled transmission from a serving base station to the first UE in a first cell using a communication beam in a beam-preference region for the communication beam, receive an indication of a second transmission to a second UE different from the first UE in a second cell different from the first cell that interferes with the scheduled transmission, transmit, to the serving base station, an indication of the second UE based on the second transmission that interferes with the scheduled transmission, and receive, from the serving base station, the scheduled transmission modified based on the indication of the second UE. The actions performed by the communications manager 715 as described herein may be implemented to realize one or more potential advantages. One implementation may allow a UE 115 to improve reception reliability by reporting interference to a base station 105. Improving reception reliability based on the modified scheduled transmission may reduce the channel overhead (e.g., due to the retransmission of messages that are not successfully received) and improve the reception latency (e.g., reducing a latency involved with receiving retransmitted messages). Furthermore, interference coordination at base stations 105 may improve reception reliability at the UE 115.

Based on identifying the interference and transmitting an indication of the second UE (e.g., indicating the second transmission that interferes with the scheduled transmission) to the serving base station 105, a processor of the UE 115 (e.g., controlling the receiver 710, the communications manager 715, the transmitter 720, etc.) may reduce processing resources used for message monitoring and reception. For example, the serving base station 105 may modify the scheduled transmission for improved reception at the UE 115 (e.g., by reducing an MCS index value for the transmission), effectively handling the unexpected interference. As such, the UE 115 may reduce the number of reception and attempted decoding processes for the scheduled transmission used to successfully receive the information. Reducing the number of reception processes may reduce a number of times the processor ramps up processing power and turns on processing units to handle downlink message reception and decoding.

The communications manager 715 may be an example of aspects of the communications manager 1010 described herein. The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
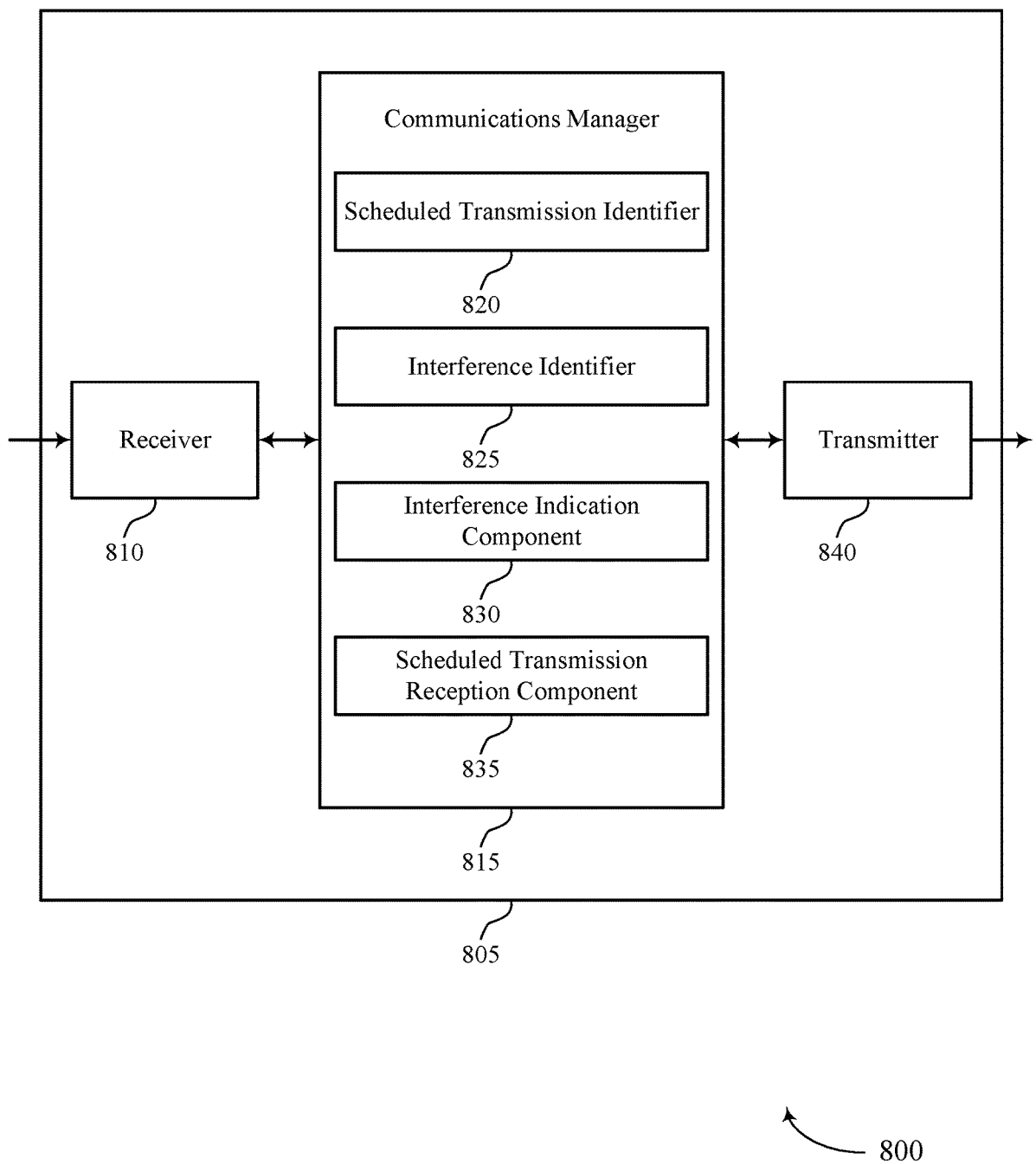

FIG. 8 shows a block diagram 800 of a device 805 that supports interference coordination region configuration in accordance with aspects of the present disclosure. The device 805 may be an example of aspects of a device 705 or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to interference coordination region configuration, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a scheduled transmission identifier 820, an interference identifier 825, an interference indication component 830, and a scheduled transmission reception component 835. The communications manager 815 may be an example of aspects of the communications manager 1010 described herein. The communications manager 815 may be implemented by a first UE.

The scheduled transmission identifier 820 may identify a scheduled transmission from a serving base station to the first UE in a first cell using a communication beam in a beam-preference region for the communication beam. The interference identifier 825 may receive an indication of a second transmission to a second UE different from the first UE in a second cell different from the first cell that interferes with the scheduled transmission. The interference indication component 830 may transmit, to the serving base station, an indication of the second UE based on the second transmission that interferes with the scheduled transmission. The scheduled transmission reception component 835 may receive, from the serving base station, the scheduled transmission modified based on the indication of the second UE.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
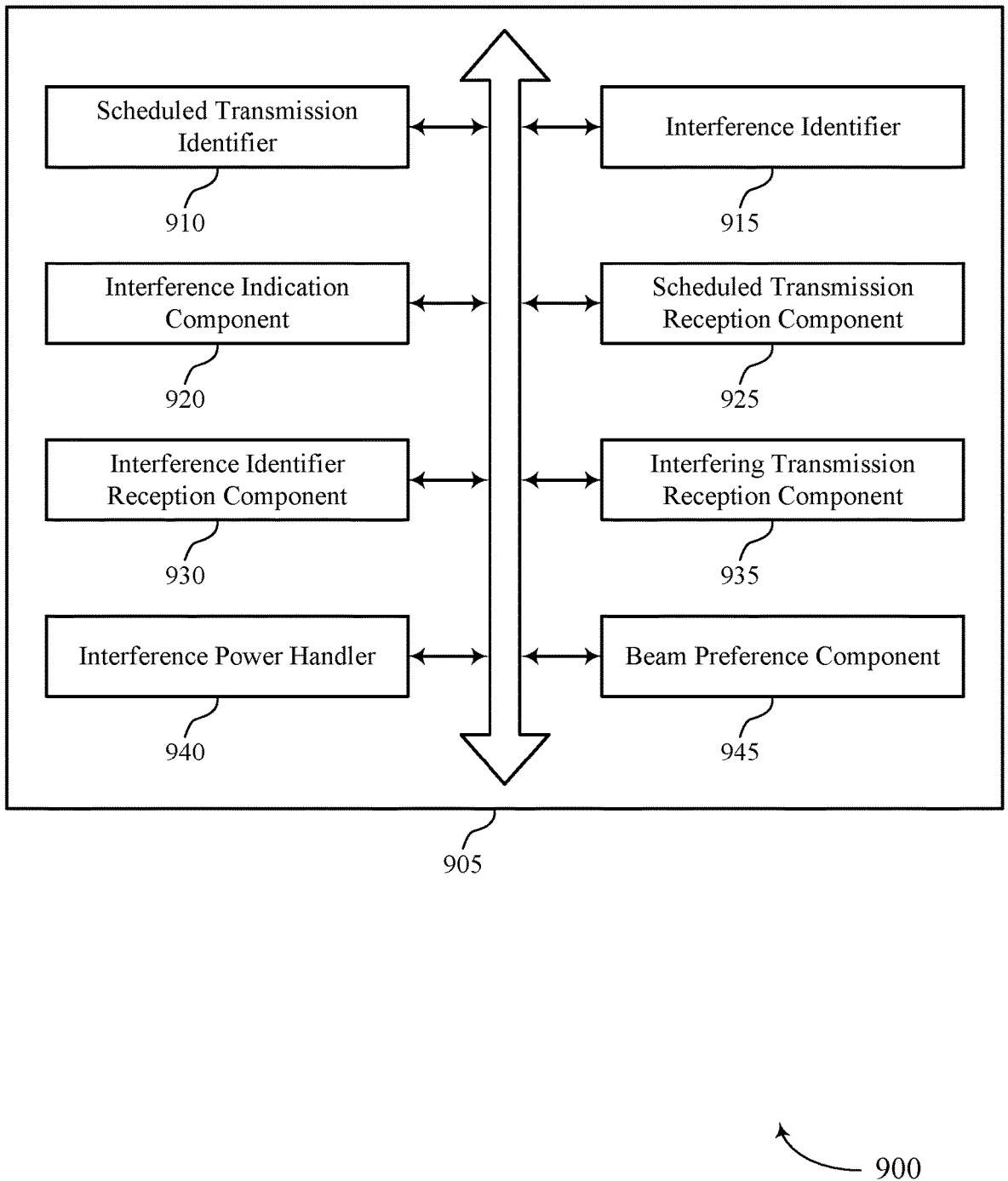
FIG. 9 shows a block diagram of a communications manager that supports interference coordination region configuration in accordance with aspects of the present disclosure.

FIG. 9 shows a block diagram 900 of a communications manager 905 that supports interference coordination region configuration in accordance with aspects of the present disclosure. The communications manager 905 may be an example of aspects of a communications manager 715, a communications manager 815, or a communications manager 1010 described herein. The communications manager 905 may include a scheduled transmission identifier 910, an interference identifier 915, an interference indication component 920, a scheduled transmission reception component 925, an interference identifier reception component 930, an interfering transmission reception component 935, an interference power handler 940, and a beam-preference component 945. Each of these modules may communicate, directly or indirectly, with one another (e.g., via one or more buses). In some cases, the communications manager 905 may be a component of a first UE.

The scheduled transmission identifier 910 may identify a scheduled transmission from a serving base station to the first UE in a first cell using a communication beam in a beam-preference region for the communication beam. The interference identifier 915 may receive an indication of a second transmission to a second UE different from the first UE in a second cell different from the first cell that interferes with the scheduled transmission.

The interference indication component 920 may transmit, to the serving base station, an indication of the second UE based on the second transmission that interferes with the scheduled transmission. The scheduled transmission reception component 925 may receive, from the serving base station, the scheduled transmission modified based on the indication of the second UE. In some cases, the scheduled transmission is modified with a decreased MCS index based on the indication of the second UE.

In some cases, the interference identifier reception component 930 may receive an OTA signal from the second UE indicating the second transmission to the second UE. In some examples, the interference identifier reception component 930 may monitor for the OTA signal from the second UE in a pre-configured resource region shared by the serving base station and a second base station serving the second UE and different from the serving base station. In some cases, the OTA signal includes one or more of DCI, a MAC CE, or a reference signal.

In some other cases, the interfering transmission reception component 935 may receive the second transmission in the beam-preference region. The interference power handler 940 may determine an interference power of the second transmission on the scheduled transmission based on a DMRS for the second transmission. In some examples, the interference power handler 940 may transmit, to the serving base station, an indication of the interference power, where the scheduled transmission is further modified based on the indication of the interference power. The beam-preference component 945 may receive, from the serving base station, an indication of the beam-preference region.

Figure 10:
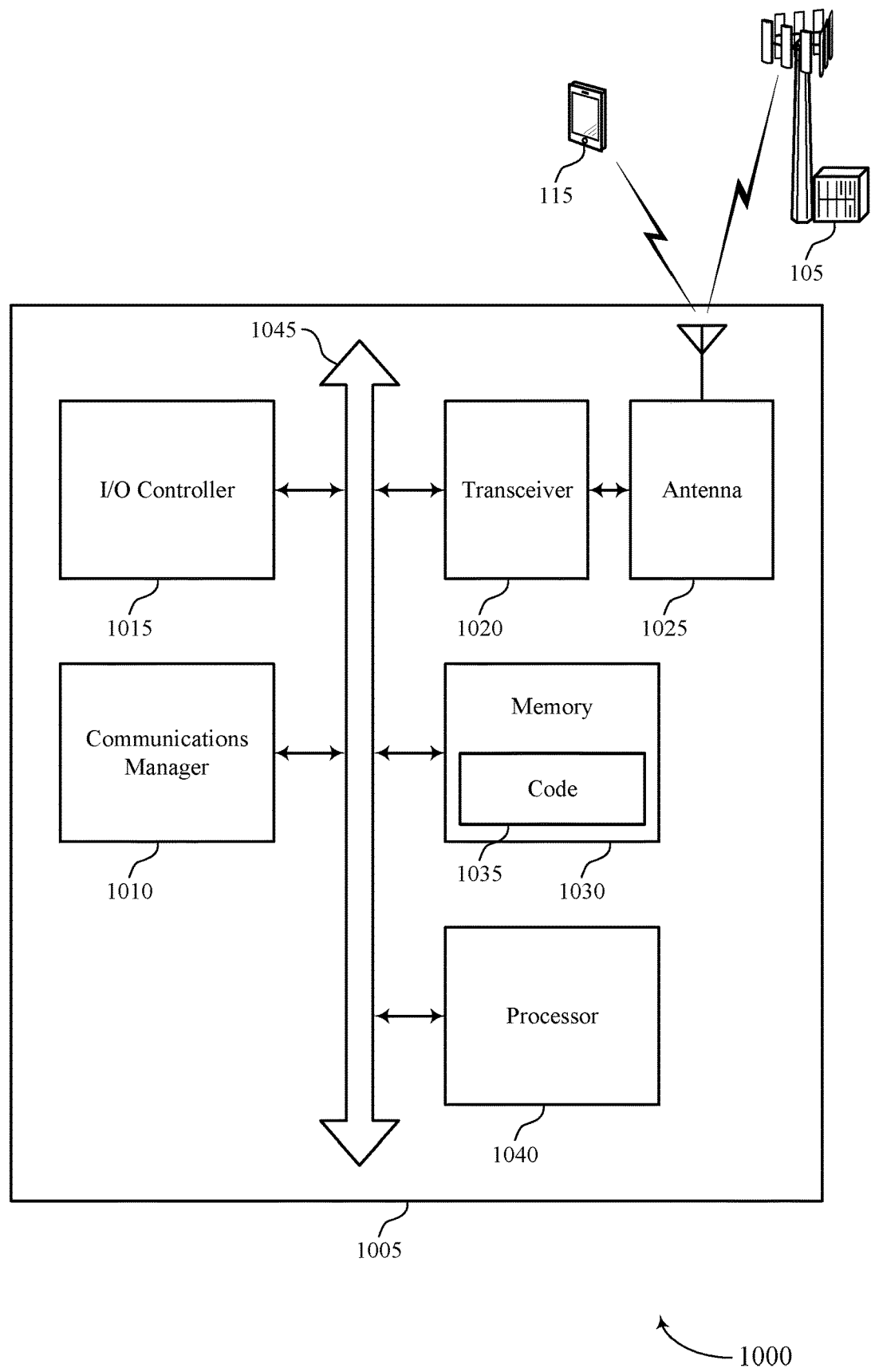
FIG. 10 shows a diagram of a system including a device that supports interference coordination region configuration in accordance with aspects of the present disclosure.

FIG. 10 shows a diagram of a system 1000 including a device 1005 that supports interference coordination region configuration in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a scheduled transmission from a serving base station to the device 1005 (e.g., a first UE) in a first cell using a communication beam in a beam-preference region for the communication beam, receive an indication of a second transmission to a second UE different from the first UE in a second cell different from the first cell that interferes with the scheduled transmission, transmit, to the serving base station, an indication of the second UE based on the second transmission that interferes with the scheduled transmission, and receive, from the serving base station, the scheduled transmission modified based on the indication of the second UE.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting interference coordination region configuration).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
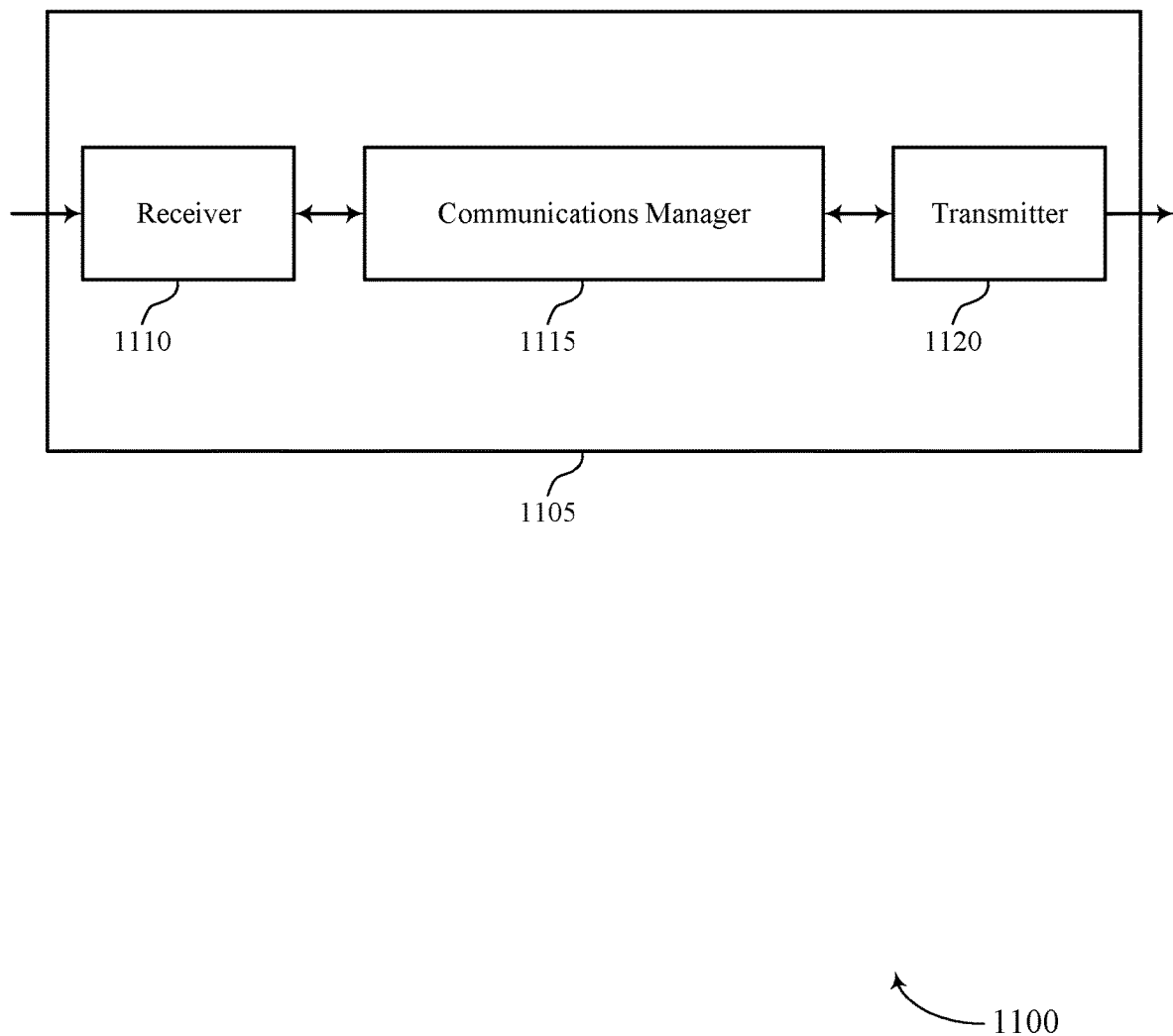
FIGS. 11 and 12 show block diagrams of devices that support interference coordination region configuration in accordance with aspects of the present disclosure.

FIG. 11 shows a block diagram 1100 of a device 1105 that supports interference coordination region configuration in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to interference coordination region configuration, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may be implemented at a first base station. The communications manager 1115 may configure a set of resources as an interference coordination region including one or both of a set of beam-avoidance sub-regions or a set of beam-preference sub-regions between the first base station and a second base station, schedule a communication beam for communication in the interference coordination region based on one or both of a beam-avoidance sub-region of the set of beam-avoidance sub-regions or a beam-preference sub-region of the set of beam-preference sub-regions, and transmit a message to a UE in the interference coordination region using the scheduled communication beam. The actions performed by the communications manager 1115 as described herein may be implemented to realize one or more potential advantages.

One implementation may allow a base station 105 to improve transmission reliability by coordinating interference with a neighboring base station 105. Improving transmission reliability may reduce the channel overhead (e.g., due to the retransmission of messages that are not successfully received) and improve the transmission latency (e.g., reducing a latency involved with retransmitting missed messages).

Based on configuring the set of resources as the interference coordination region and scheduling a communication beam based on the interference coordination region, a processor of the base station 105 (e.g., controlling the receiver 1110, the communications manager 1115, the transmitter 1120, etc.) may reduce processing resources used for message retransmission. For example, performing interference coordination may schedule communication beams in resources that improve transmission reliability (e.g., by reducing or avoiding signal collisions at the UE 115). As such, the base station 105 may reduce the number of retransmissions used to successfully send information to the UE 115. Reducing the number of transmission processes may reduce a number of times the processor ramps up processing power and turns on processing units to handle downlink message encoding and transmission.

The communications manager 1115 may be an example of aspects of the communications manager 1410 described herein. The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
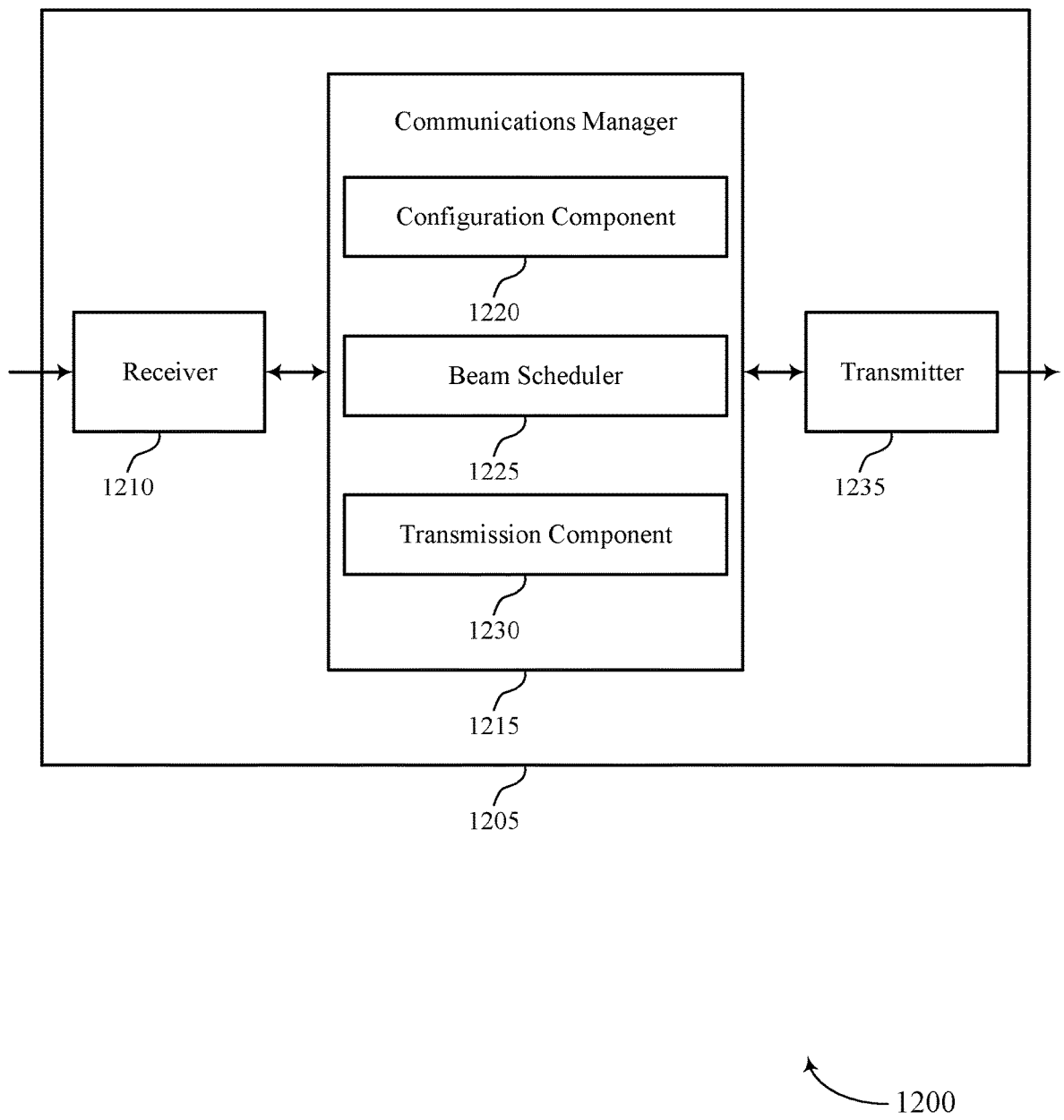

FIG. 12 shows a block diagram 1200 of a device 1205 that supports interference coordination region configuration in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to interference coordination region configuration, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration component 1220, a beam scheduler 1225, and a transmission component 1230. The communications manager 1215 may be an example of aspects of the communications manager 1410 described herein. The communications manager 1215 may be implemented at a first base station.

The configuration component 1220 may configure a set of resources as an interference coordination region including one or both of a set of beam-avoidance sub-regions or a set of beam-preference sub-regions between the first base station and a second base station. The beam scheduler 1225 may schedule a communication beam for communication in the interference coordination region based on one or both of a beam-avoidance sub-region of the set of beam-avoidance sub-regions or a beam-preference sub-region of the set of beam-preference sub-regions.

The transmission component 1230 may transmit a message to a UE in the interference coordination region using the scheduled communication beam. In some cases, the transmission component 1230 may be a component of or associated with the transmitter 1235. The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
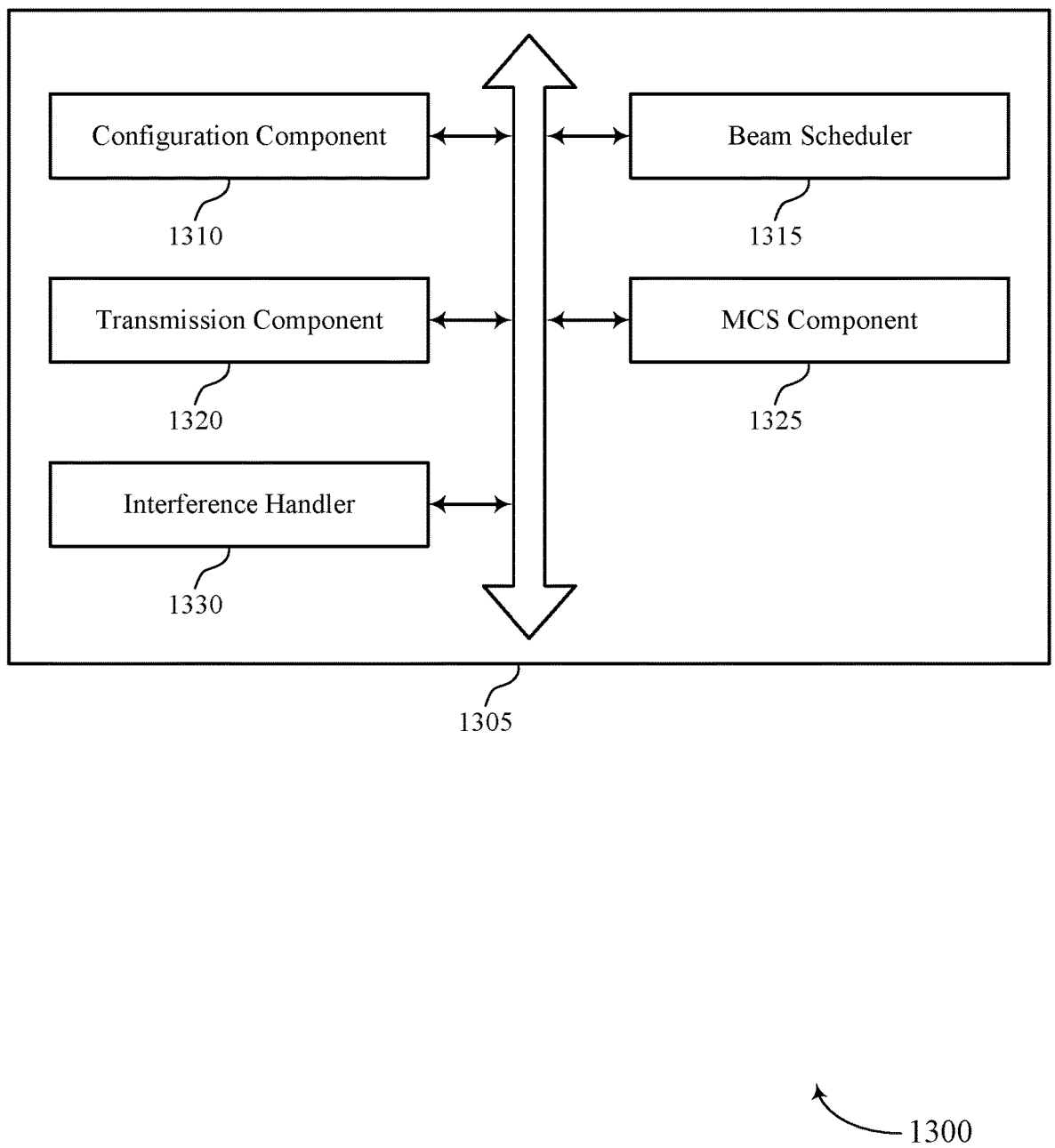
FIG. 13 shows a block diagram of a communications manager that supports interference coordination region configuration in accordance with aspects of the present disclosure.

FIG. 13 shows a block diagram 1300 of a communications manager 1305 that supports interference coordination region configuration in accordance with aspects of the present disclosure. The communications manager 1305 may be an example of aspects of a communications manager 1115, a communications manager 1215, or a communications manager 1410 described herein. The communications manager 1305 may include a configuration component 1310, a beam scheduler 1315, a transmission component 1320, an MCS component 1325, and an interference handler 1330. Each of these modules may communicate, directly or indirectly, with one another (e.g., via one or more buses). In some cases, the communications manager 1305 may be a component of a first base station.

The configuration component 1310 may configure a set of resources as an interference coordination region including one or both of a set of beam-avoidance sub-regions or a set of beam-preference sub-regions between the first base station and a second base station. In some examples, the configuration component 1310 may receive one or both of communication beam information or configuration information associated with the second base station, where the set of resources is configured as the interference coordination region based on one or both of the communication beam information or the configuration information.

In some examples, the configuration component 1310 may receive, from a centralized unit, a configuration of the set of resources as the interference coordination region. In some cases, the configuration of the set of resources as the interference coordination region is common for each base station. In some other examples, the configuration component 1310 may receive, from the second base station, a configuration for the second base station of a second set of resources as a second interference coordination region between the second base station and the first base station, where the set of resources configured as the interference coordination region is the same as the second set of resources configured as the second interference coordination region. In some cases, each beam-avoidance sub-region of the second interference coordination region is configured as a respective beam-preference sub-region of the interference coordination region. Additionally or alternatively, each beam-preference sub-region of the second interference coordination region is configured as a respective beam-avoidance sub-region of the interference coordination region.

In some examples, the configuration component 1310 may determine the set of resources based on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

In some cases, the set of resources configured as the interference coordination region is one or both of FDMed or TDMed with a second set of resources configured for communication. In some cases, the set of resources configured as the interference coordination region is repeated in time according to a periodicity.

The beam scheduler 1315 may schedule a communication beam for communication in the interference coordination region based on one or both of a beam-avoidance sub-region of the set of beam-avoidance sub-regions or a beam-preference sub-region of the set of beam-preference sub-regions. In some examples, the beam scheduler 1315 may determine a first communication beam associated with the beam-preference sub-region of the interference coordination region and may schedule the first communication beam for communication in the beam-preference sub-region of the interference coordination region. In some other examples, the beam scheduler 1315 may determine a first communication beam associated with the beam-avoidance sub-region of the interference coordination region and may refrain from scheduling the first communication beam for communication in the beam-avoidance sub-region of the interference coordination region.

In yet other examples, the beam scheduler 1315 may determine a first communication beam associated with the beam-avoidance sub-region of the interference coordination region and may schedule the first communication beam for communication in the beam-avoidance sub-region of the interference coordination region based on one or both of a priority level of the UE or a priority level of the transmission. In some cases, one or both of a set of beam-avoidance sub-regions of the interference coordination region or a set of beam-preference sub-regions of the interference coordination region is one or both of FDMed or TDMed in the interference coordination region. The transmission component 1320 may transmit a message to a UE in the interference coordination region using the scheduled communication beam.

The MCS component 1325 may select a first MCS index for transmission in the beam-preference sub-region of the interference coordination region that is greater than a second MCS index for transmission in a second set of resources for communication. In some examples, the interference handler 1330 may receive an indication of an interfering transmission to the UE in the beam-preference sub-region of the interference coordination region, and the MCS component 1325 may reduce the first MCS index for transmission in the beam-preference sub-region of the interference coordination region based on the indication of the interfering transmission.

Figure 14:
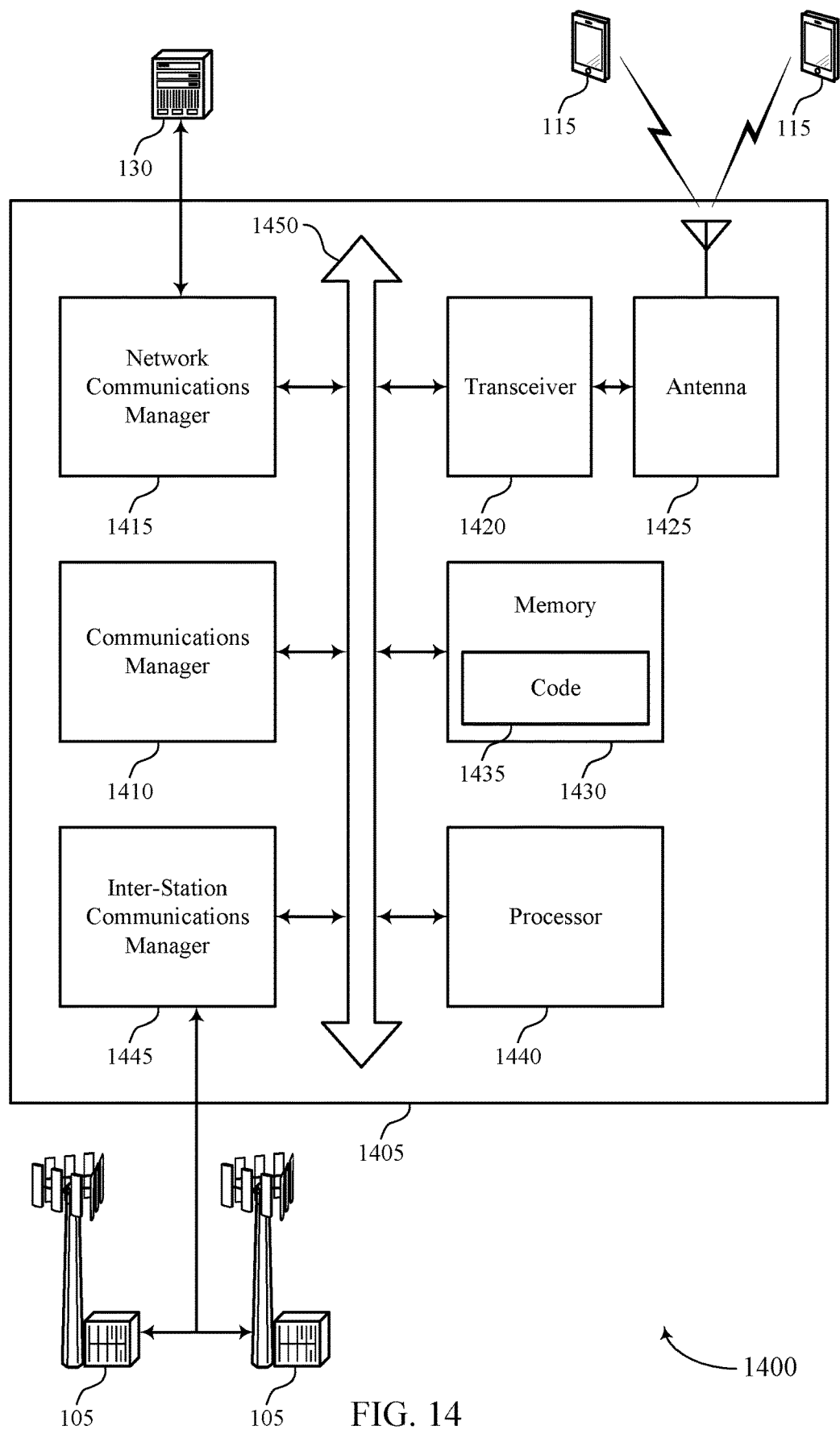
FIG. 14 shows a diagram of a system including a device that supports interference coordination region configuration in accordance with aspects of the present disclosure.

FIG. 14 shows a diagram of a system 1400 including a device 1405 that supports interference coordination region configuration in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may configure a set of resources as an interference coordination region including one or both of a set of beam-avoidance sub-regions or a set of beam-preference sub-regions between the device 1405 (e.g., a first base station) and a second base station, schedule a communication beam for communication in the interference coordination region based on one or both of a beam-avoidance sub-region of the set of beam-avoidance sub-regions or a beam-preference sub-region of the set of beam-preference sub-regions, and transmit a message to a UE in the interference coordination region using the scheduled communication beam.

The network communications manager 1415 may manage communications with the core network 130 (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting interference coordination region configuration).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
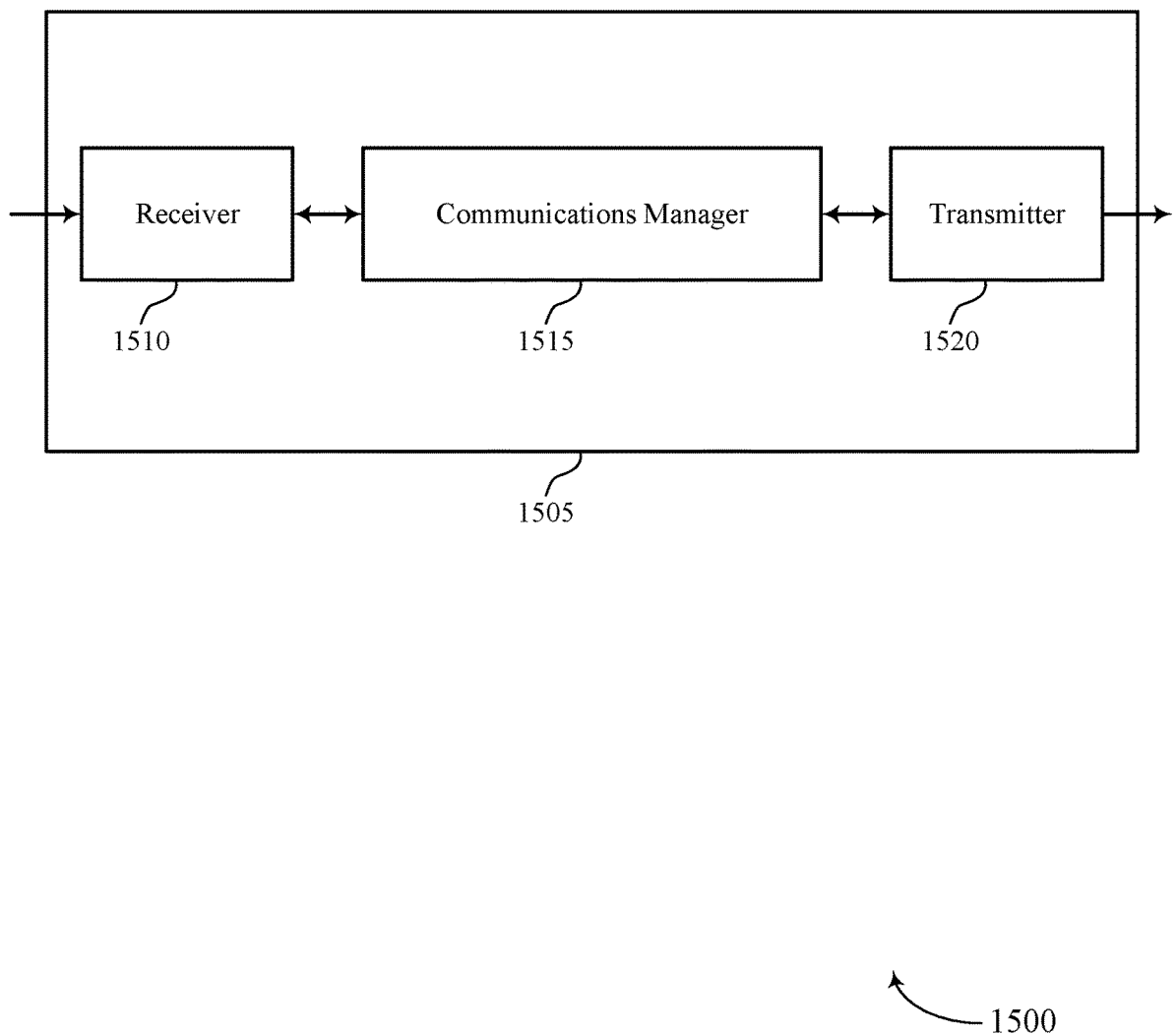
FIGS. 15 and 16 show block diagrams of devices that support interference coordination region configuration in accordance with aspects of the present disclosure.

FIG. 15 shows a block diagram 1500 of a device 1505 that supports interference coordination region configuration in accordance with aspects of the present disclosure. The device 1505 may be an example of aspects of a network entity as described herein (e.g., a base station, a centralized unit, or some other network device). The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to interference coordination region configuration, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may receive communication beam information for a first base station, configure a set of resources as an interference coordination region between the first base station and a second base station based on the communication beam information for the first base station, where the interference coordination region includes one or both of a set of beam-avoidance sub-regions or a set of beam-preference sub-regions, and transmit an indication of the set of resources configured as the interference coordination region to the first base station. The actions performed by the communications manager 1515 as described herein may be implemented to realize one or more potential advantages. One implementation may allow a network device to improve transmission reliability in the system by coordinating interference between base stations 105. Improving transmission reliability may reduce the channel overhead (e.g., due to the retransmission of messages that are not successfully received) and improve the transmission latency (e.g., reducing a latency involved with retransmitting missed messages).

Based on configuring the set of resources as the interference coordination region between base stations 105, a processor of the network device (e.g., controlling the receiver 1510, the communications manager 1515, the transmitter 1520, etc.) may reduce processing resources used for message retransmission (e.g., at a base station 105 or at the network device). For example, performing interference coordination may schedule communication beams in resources that improve transmission reliability (e.g., by reducing or avoiding signal collisions at the UE 115). As such, a base station 105 (e.g., the network device in a distributed implementation) may reduce the number of retransmissions used to successfully send information to a UE 115. Reducing the number of transmission processes may reduce a number of times the processor ramps up processing power and turns on processing units to handle message encoding and transmission.

The communications manager 1515 may be an example of aspects of the communications manager 1810 described herein. The communications manager 1515, or its subcomponents, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
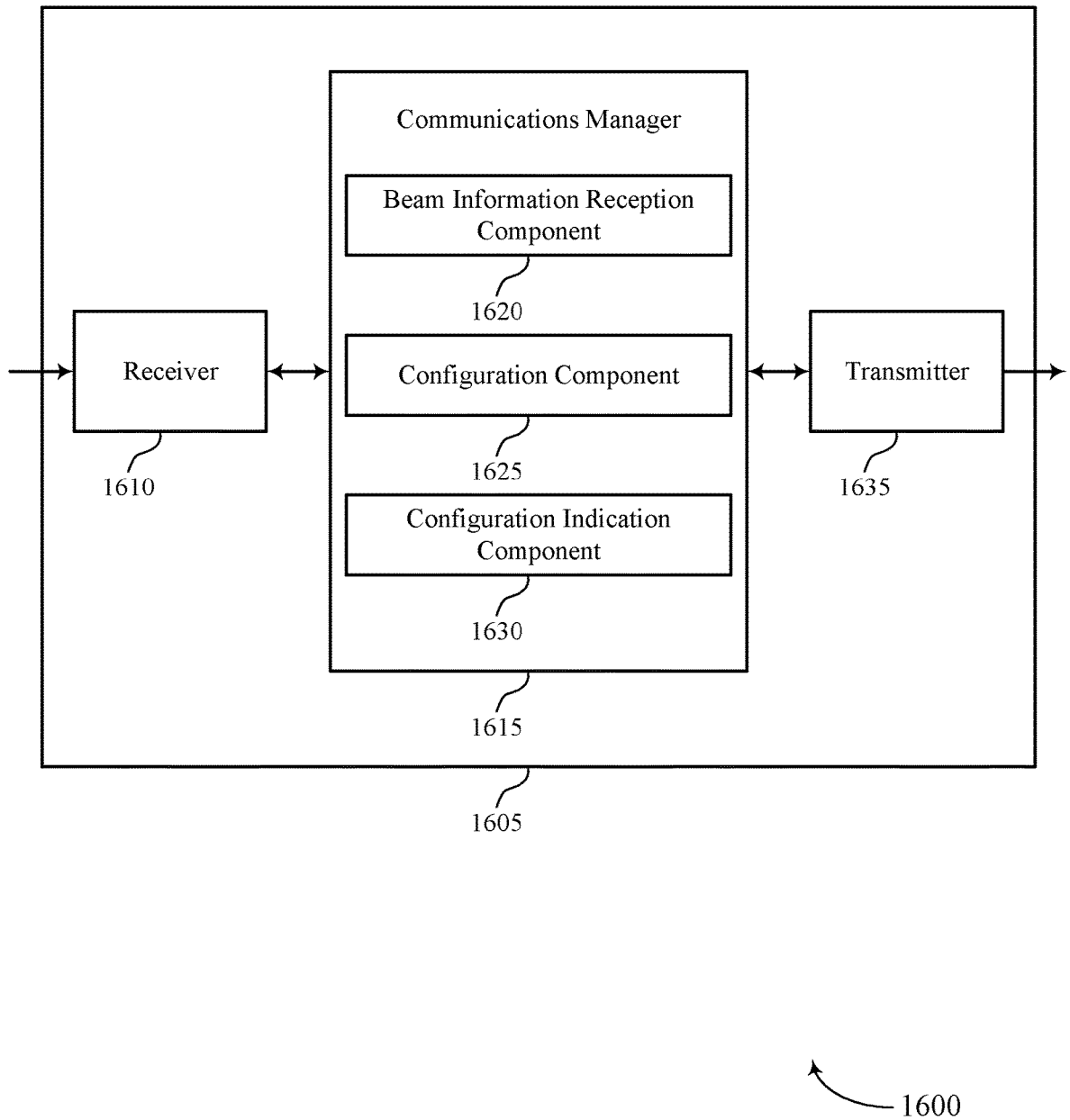

FIG. 16 shows a block diagram 1600 of a device 1605 that supports interference coordination region configuration in accordance with aspects of the present disclosure. The device 1605 may be an example of aspects of a device 1505 or a network entity (e.g., a base station, a centralized unit, or some other network device) as described herein. The device 1605 may include a receiver 1610, a communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to interference coordination region configuration, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a beam information reception component 1620, a configuration component 1625, and a configuration indication component 1630. The communications manager 1615 may be an example of aspects of the communications manager 1810 described herein.

The beam information reception component 1620 may receive communication beam information for a first base station. The configuration component 1625 may configure a set of resources as an interference coordination region between the first base station and a second base station based on the communication beam information for the first base station, where the interference coordination region includes one or both of a set of beam-avoidance sub-regions or a set of beam-preference sub-regions. The configuration indication component 1630 may transmit an indication of the set of resources configured as the interference coordination region to the first base station.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
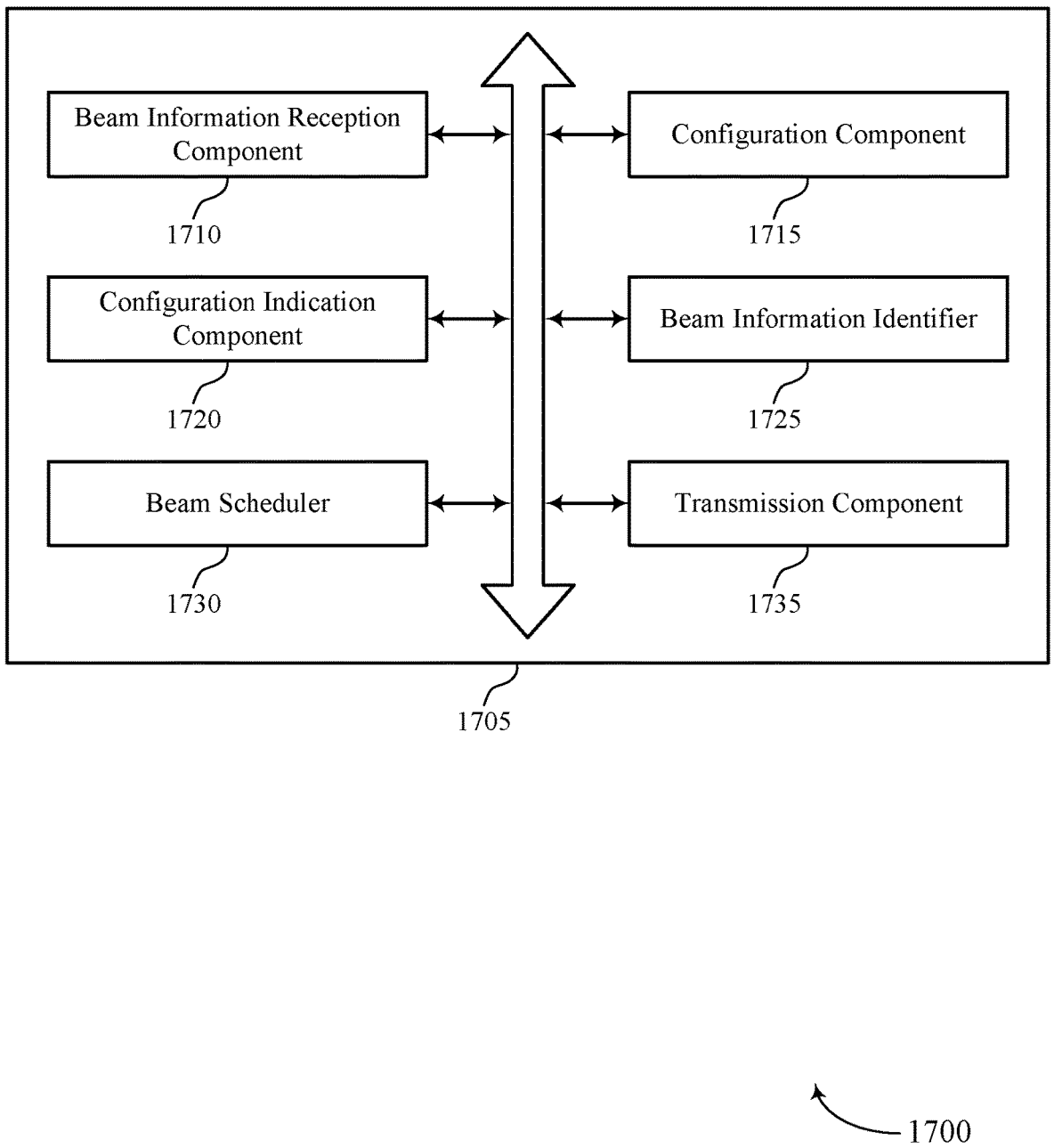
FIG. 17 shows a block diagram of a communications manager that supports interference coordination region configuration in accordance with aspects of the present disclosure.

FIG. 17 shows a block diagram 1700 of a communications manager 1705 that supports interference coordination region configuration in accordance with aspects of the present disclosure. The communications manager 1705 may be an example of aspects of a communications manager 1515, a communications manager 1615, or a communications manager 1810 described herein. The communications manager 1705 may include a beam information reception component 1710, a configuration component 1715, a configuration indication component 1720, a beam information identifier 1725, a beam scheduler 1730, and a transmission component 1735. Each of these modules may communicate, directly or indirectly, with one another (e.g., via one or more buses).

The beam information reception component 1710 may receive communication beam information for a first base station. The configuration component 1715 may configure a set of resources as an interference coordination region between the first base station and a second base station based on the communication beam information for the first base station, where the interference coordination region includes one or both of a set of beam-avoidance sub-regions or a set of beam-preference sub-regions. The configuration indication component 1720 may transmit an indication of the set of resources configured as the interference coordination region to the first base station.

In some examples, the communications manager 1705 may be implemented at a centralized unit (e.g., for network scheduling). In these examples, the beam information reception component 1710 may receive communication beam information for the second base station, where the set of resources is configured as the interference coordination region further based on the communication beam information for the second base station. In some examples, the configuration component 1715 may configure a second set of resources as a second interference coordination region between the second base station and the first base station based on the communication beam information for the second base station and the communication beam information for the first base station, where the second interference coordination region includes one or both of a second set of beam-avoidance sub-regions or a second set of beam-preference sub-regions. In some examples, the configuration indication component 1720 may transmit an indication of the second set of resources configured as the second interference coordination region to the second base station.

In some cases, each beam-avoidance sub-region of the interference coordination region is configured as a respective beam-preference sub-region of the second interference coordination region. Additionally or alternatively, each beam-preference sub-region of the interference coordination region is configured as a respective beam-avoidance sub-region of the interference coordination region. In some examples, the beam information reception component 1710 may receive communication beam information for a third base station and the configuration component 1715 may configure a third set of resources as a third interference coordination region for the third base station, where the interference coordination region, the second interference coordination region, and the third interference coordination region are the same.

In some other examples, the communications manager 1705 may be implemented at the second base station (e.g., for distributed configuration). The beam information identifier 1725 may determine communication beam information for the second base station, where the set of resources is configured as the interference coordination region further based on the communication beam information for the second base station. The configuration component 1715 may configure a second set of resources as a second interference coordination region between the second base station and the first base station based on the communication beam information for the second base station and the communication beam information for the first base station, where the second interference coordination region includes one or both of a second set of beam-avoidance sub-regions or a second set of beam-preference sub-regions. The beam scheduler 1730 may schedule a communication beam for communication in the second interference coordination region based on one or both of a beam-avoidance sub-region of the second set of beam-avoidance sub-regions or a beam-preference sub-region of the second set of beam-preference sub-regions. The transmission component 1735 may transmit a message to a UE in the second interference coordination region using the scheduled communication beam. In some cases, each beam-avoidance sub-region of the interference coordination region is configured as a respective beam-preference sub-region of the second interference coordination region. Additionally or alternatively, each beam-preference sub-region of the interference coordination region is configured as a respective beam-avoidance sub-region of the interference coordination region.

In some examples, the configuration component 1715 may determine the set of resources based on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

In some cases, the set of resources configured as the interference coordination region is one or both of FDMed or TDMed with a second set of resources configured for communication. In some cases, one or both of the set of beam-avoidance sub-regions or the set of beam-preference sub-regions is one or both of FDMed or TDMed in the interference coordination region. In some cases, the set of resources configured as the interference coordination region is repeated in time according to a periodicity.

Figure 18:
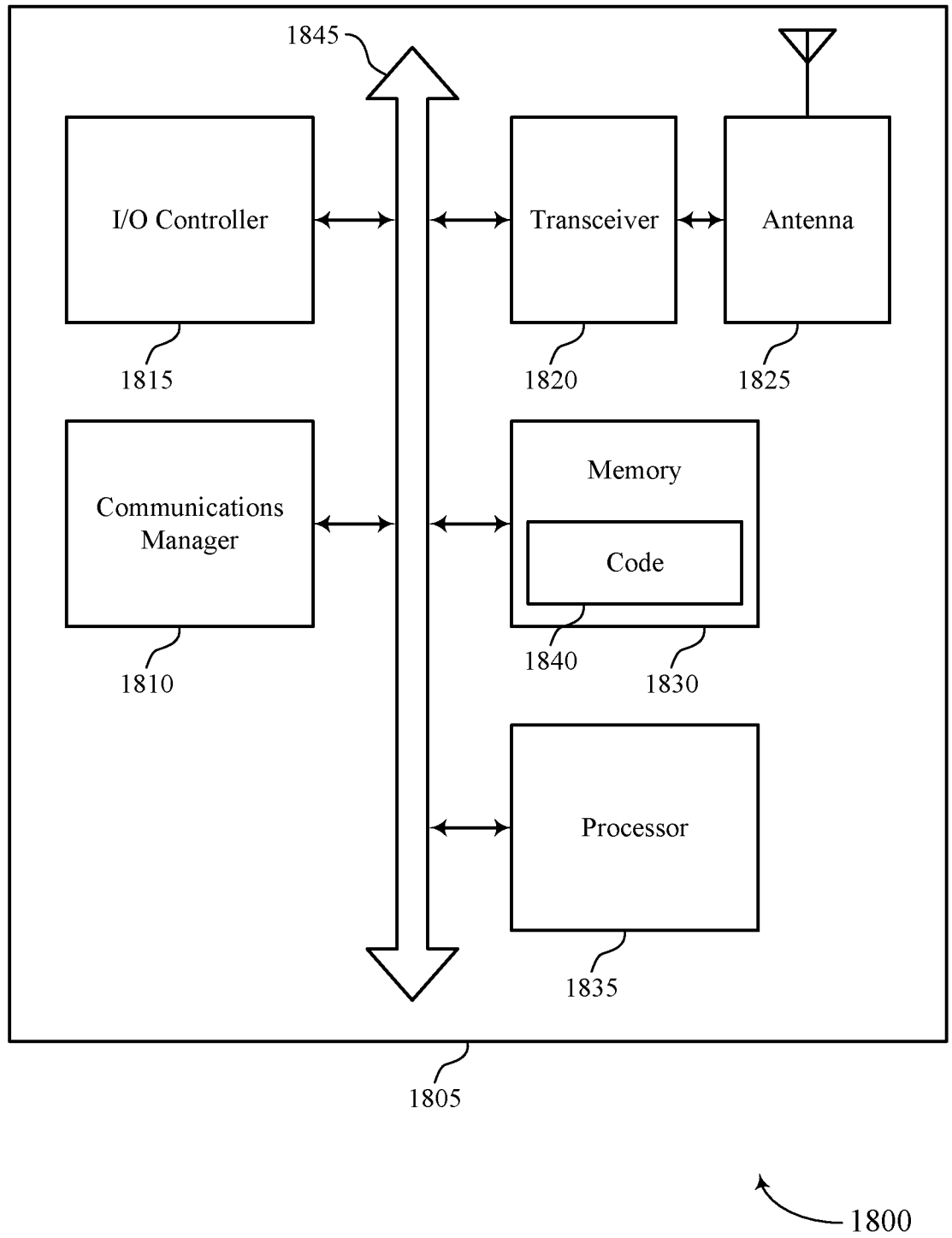
FIG. 18 shows a diagram of a system including a device that supports interference coordination region configuration in accordance with aspects of the present disclosure.

FIG. 18 shows a diagram of a system 1800 including a device 1805 that supports interference coordination region configuration in accordance with aspects of the present disclosure. The device 1805 may be an example of or include the components of device 1505, device 1605, or a network entity (e.g., a base station, a centralized unit, etc.) as described herein. The device 1805 may include components for bi-directional voice and data communications including components for transmitting and receiving communications, including a communications manager 1810, an I/O controller 1815, a transceiver 1820, an antenna 1825, memory 1830, and a processor 1835. These components may be in electronic communication via one or more buses (e.g., bus 1845).

The communications manager 1810 may receive communication beam information for a first base station, configure a set of resources as an interference coordination region between the first base station and a second base station based on the communication beam information for the first base station, where the interference coordination region includes one or both of a set of beam-avoidance sub-regions or a set of beam-preference sub-regions, and transmit an indication of the set of resources configured as the interference coordination region to the first base station.

The I/O controller 1815 may manage input and output signals for the device 1805. The I/O controller 1815 may also manage peripherals not integrated into the device 1805. In some cases, the I/O controller 1815 may represent a physical connection or port to an external peripheral. In some cases, the I/O controller 1815 may utilize an operating system such as iOS®, ANDROID®, MS-DOS®, MS-WINDOWS®, OS/2, UNIX®, LINUX®, or another known operating system. In other cases, the I/O controller 1815 may represent or interact with a modem, a keyboard, a mouse, a touchscreen, or a similar device. In some cases, the I/O controller 1815 may be implemented as part of a processor. In some cases, a user may interact with the device 1805 via the I/O controller 1815 or via hardware components controlled by the I/O controller 1815.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM and ROM. The memory 1830 may store computer-readable, computer-executable code 1840 including instructions that, when executed, cause the processor to perform various functions described herein. In some cases, the memory 1830 may contain, among other things, a BIOS which may control basic hardware or software operation such as the interaction with peripheral components or devices.

The processor 1835 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1835 may be configured to operate a memory array using a memory controller. In other cases, a memory controller may be integrated into the processor 1835. The processor 1835 may be configured to execute computer-readable instructions stored in a memory (e.g., the memory 1830) to cause the device 1805 to perform various functions (e.g., functions or tasks supporting interference coordination region configuration).

The code 1840 may include instructions to implement aspects of the present disclosure, including instructions to support wireless communications. The code 1840 may be stored in a non-transitory computer-readable medium such as system memory or other type of memory. In some cases, the code 1840 may not be directly executable by the processor 1835 but may cause a computer (e.g., when compiled and executed) to perform functions described herein.

Figure 19:
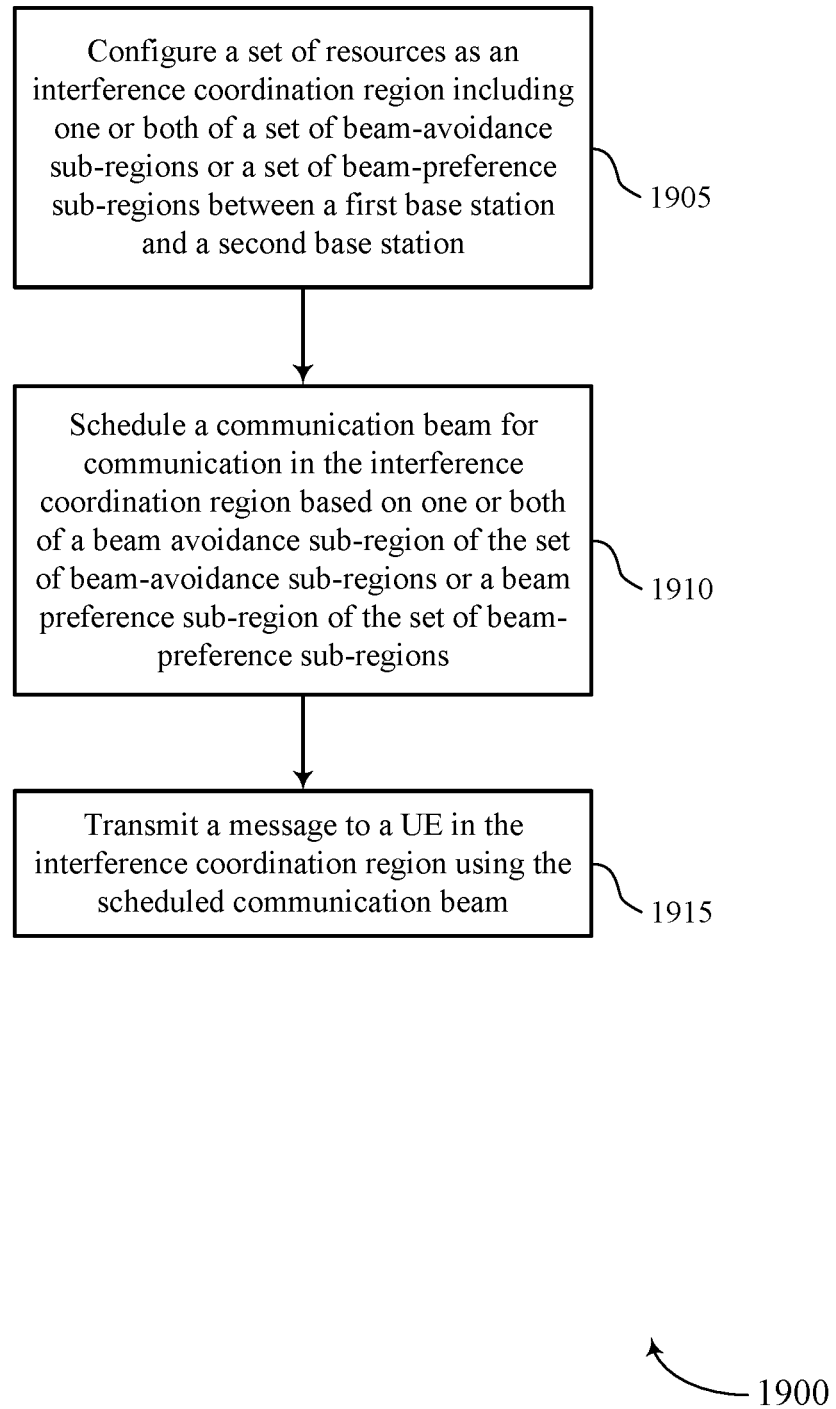
FIGS. 19 through 21 show flowcharts illustrating methods that support interference coordination region configuration in accordance with aspects of the present disclosure.

FIG. 19 shows a flowchart illustrating a method 1900 that supports interference coordination region configuration in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station (i.e., a first base station) may configure a set of resources as an interference coordination region including one or both of a set of beam-avoidance sub-regions or a set of beam-preference sub-regions between the first base station and a second base station. The operations of 1905 may be performed according to the methods described herein. In some examples, aspects of the operations of 1905 may be performed by a configuration component as described with reference to FIGS. 11 through 14.

At 1910, the base station may schedule a communication beam for communication in the interference coordination region based on one or both of a beam-avoidance sub-region of the set of beam-avoidance sub-regions or a beam-preference sub-region of the set of beam-preference sub-regions. The operations of 1910 may be performed according to the methods described herein. In some examples, aspects of the operations of 1910 may be performed by a beam scheduler as described with reference to FIGS. 11 through 14.

At 1915, the base station may transmit a message to a UE in the interference coordination region using the scheduled communication beam. The operations of 1915 may be performed according to the methods described herein. In some examples, aspects of the operations of 1915 may be performed by a transmission component as described with reference to FIGS. 11 through 14.

Figure 20:
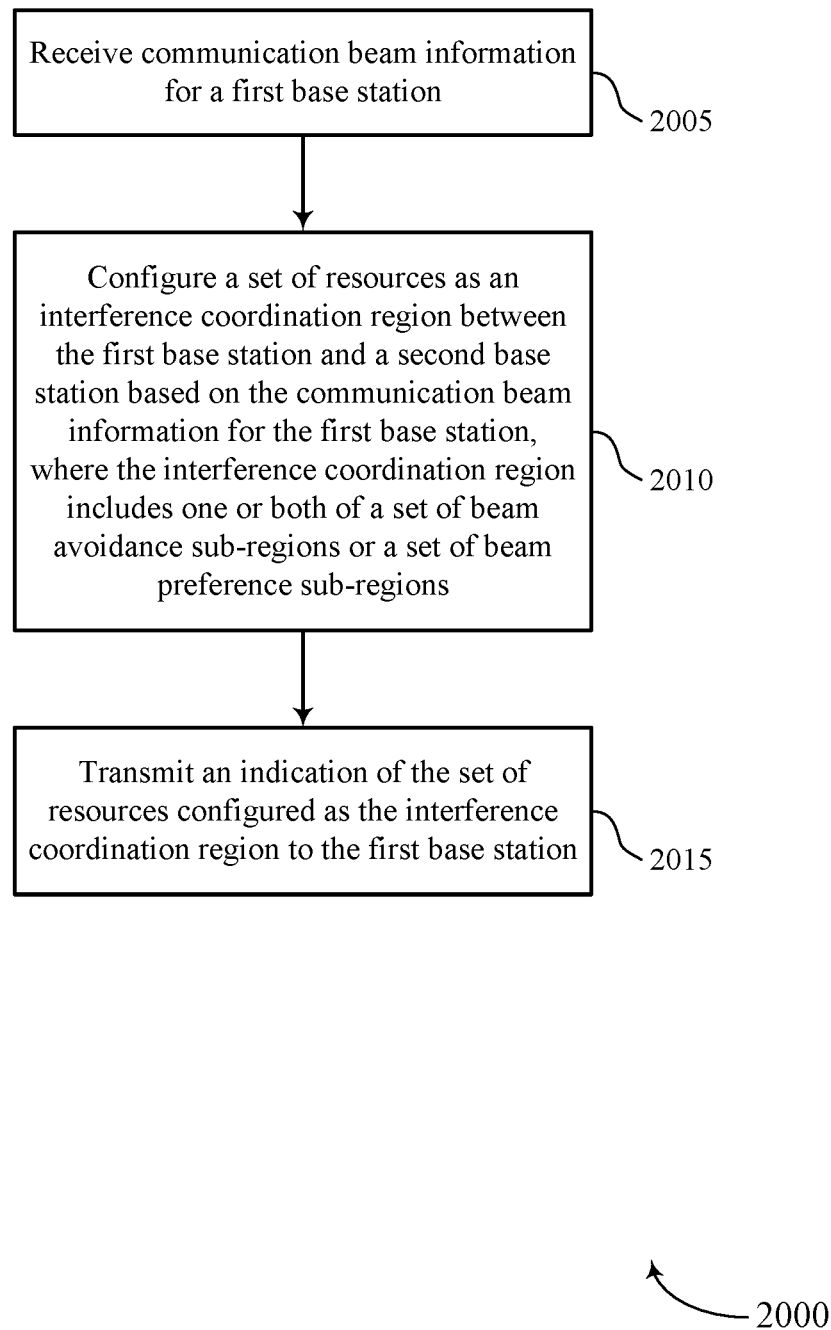

FIG. 20 shows a flowchart illustrating a method 2000 that supports interference coordination region configuration in accordance with aspects of the present disclosure. The operations of method 2000 may be implemented by a network entity (e.g., a base station, a centralized unit, or some other device in a wireless network) or its components as described herein. For example, the operations of method 2000 may be performed by a communications manager as described with reference to FIGS. 15 through 18. In some examples, a network entity may execute a set of instructions to control the functional elements of the network entity to perform the functions described below. Additionally or alternatively, a network entity may perform aspects of the functions described below using special-purpose hardware.

At 2005, the network entity may receive communication beam information for a first base station. The operations of 2005 may be performed according to the methods described herein. In some examples, aspects of the operations of 2005 may be performed by a beam information reception component as described with reference to FIGS. 15 through 18.

At 2010, the network entity may configure a set of resources as an interference coordination region between the first base station and a second base station based on the communication beam information for the first base station, where the interference coordination region includes one or both of a set of beam-avoidance sub-regions or a set of beam-preference sub-regions. The operations of 2010 may be performed according to the methods described herein. In some examples, aspects of the operations of 2010 may be performed by a configuration component as described with reference to FIGS. 15 through 18.

At 2015, the network entity may transmit an indication of the set of resources configured as the interference coordination region to the first base station. The operations of 2015 may be performed according to the methods described herein. In some examples, aspects of the operations of 2015 may be performed by a configuration indication component as described with reference to FIGS. 15 through 18.

Figure 21:
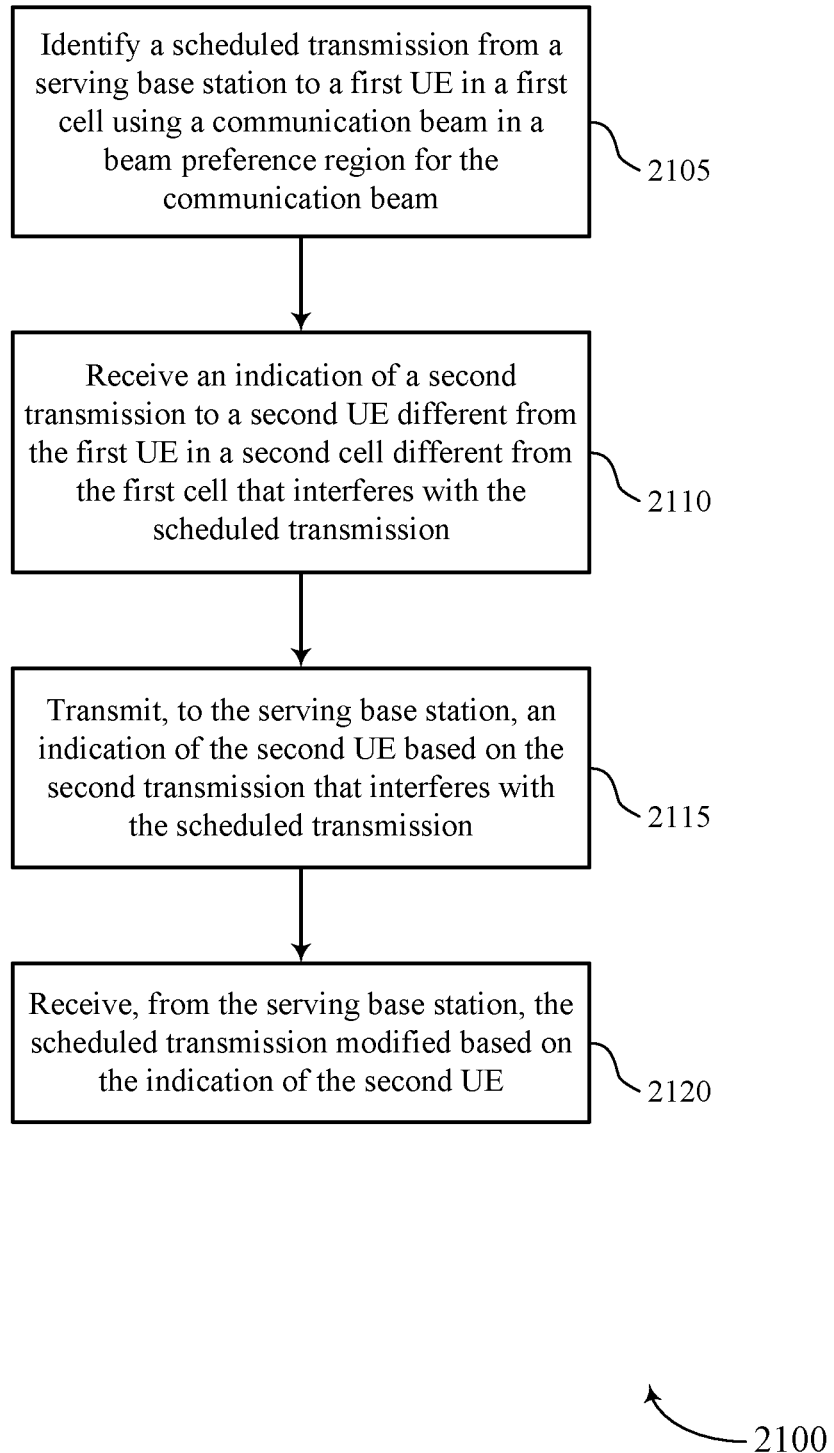

FIG. 21 shows a flowchart illustrating a method 2100 that supports interference coordination region configuration in accordance with aspects of the present disclosure. The operations of method 2100 may be implemented by a UE 115 or its components as described herein. For example, the operations of method 2100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2105, the UE (i.e., a first UE) may identify a scheduled transmission from a serving base station to the first UE in a first cell using a communication beam in a beam-preference region for the communication beam. The operations of 2105 may be performed according to the methods described herein. In some examples, aspects of the operations of 2105 may be performed by a scheduled transmission identifier as described with reference to FIGS. 7 through 10.

At 2110, the UE may receive an indication of a second transmission to a second UE different from the first UE in a second cell different from the first cell that interferes with the scheduled transmission. The operations of 2110 may be performed according to the methods described herein. In some examples, aspects of the operations of 2110 may be performed by an interference identifier as described with reference to FIGS. 7 through 10.

At 2115, the UE may transmit, to the serving base station, an indication of the second UE based on the second transmission that interferes with the scheduled transmission. The operations of 2115 may be performed according to the methods described herein. In some examples, aspects of the operations of 2115 may be performed by an interference indication component as described with reference to FIGS. 7 through 10.

At 2120, the UE may receive, from the serving base station, the scheduled transmission modified based on the indication of the second UE. The operations of 2120 may be performed according to the methods described herein. In some examples, aspects of the operations of 2120 may be performed by a scheduled transmission reception component as described with reference to FIGS. 7 through 10.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method of wireless communications at a first base station that includes configuring a set of resources as an interference coordination region including one or both of a set of beam-avoidance sub-regions or a set of beam-preference sub-regions between the first base station and a second base station, scheduling a communication beam for communication in the interference coordination region based on one or both of a beam-avoidance sub-region of the set of beam-avoidance sub-regions or a beam-preference sub-region of the set of beam-preference sub-regions, and transmitting a message to a UE in the interference coordination region using the scheduled communication beam.

In example 2, scheduling the communication beam of example 1 includes determining a first communication beam associated with the beam-preference sub-region of the interference coordination region and scheduling the first communication beam for communication in the beam-preference sub-region of the interference coordination region.

In example 3, the method of example 2 includes selecting a first MCS index for transmission in the beam-preference sub-region of the interference coordination region that is greater than a second MCS index for transmission in a second set of resources for communication.

In example 4, the method of example 3 includes receiving an indication of an interfering transmission to the UE in the beam-preference sub-region of the interference coordination region and reducing the first MCS index for transmission in the beam-preference sub-region of the interference coordination region based on the indication of the interfering transmission.

In example 5, scheduling the communication beam of any of examples 1-4 includes determining a first communication beam associated with the beam-avoidance sub-region of the interference coordination region and refraining from scheduling the first communication beam for communication in the beam-avoidance sub-region of the interference coordination region.

In example 6, scheduling the communication beam of any of examples 1-4 includes determining a first communication beam associated with the beam-avoidance sub-region of the interference coordination region and scheduling the first communication beam for communication in the beam-avoidance sub-region of the interference coordination region based on one or both of a priority level of the UE or a priority level of the transmission.

In example 7, the method of any of examples 1-6 includes receiving one or both of communication beam information or configuration information associated with the second base station, where the set of resources may be configured as the interference coordination region based on one or both of the communication beam information or the configuration information.

In example 8, configuring the set of resources as the interference coordination region of any of examples 1-7 includes receiving, from a centralized unit, a configuration of the set of resources as the interference coordination region.

In example 9, configuring the set of resources as the interference coordination region of any of examples 1-8 may be common for each base station.

In example 10, configuring the set of resources as the interference coordination region of any of example 1-7 includes receiving, from the second base station, a configuration for the second base station of a second set of resources as a second interference coordination region between the second base station and the first base station, where the set of resources configured as the interference coordination region may be the same as the second set of resources configured as the second interference coordination region.

In example 11, the method of example 10 includes that each beam-avoidance sub-region of the second interference coordination region may be configured as a respective beam-preference sub-region of the interference coordination region, and each beam-preference sub-region of the second interference coordination region may be configured as a respective beam-avoidance sub-region of the interference coordination region.

In example 12, configuring the set of resources as the interference region of any of examples 1-11 includes determining the set of resources based on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

In example 13, the set of resources configured as the interference coordination region of examples 1-12 may be one or both of FDMed or TDMed with a second set of resources configured for communication.

In example 14, one or both of the set of beam-avoidance sub-regions of the interference coordination region or the set of beam-preference sub-regions of the interference coordination region of examples 1-13 may be one or both of FDMed or TDMed in the interference coordination region.

In example 15, the set of resources configured as the interference coordination region of examples 1-14 may be repeated in time according to a periodicity.

Example 16 is a system or apparatus including means for implementing a method or realizing an apparatus as in any of examples 1-15.

Example 17 is a non-transitory computer-readable medium storing instructions executable by one or more processors to cause the one or more processors to implement a method as in any of examples 1-15.

Example 18 is a system including one or more processors and memory in electronic communication with the one or more processors storing instructions executable by the one or more processors to cause the system or apparatus to implement a method as in any of examples 1-15.

Example 19 is a method of wireless communications at a device in a wireless network that includes receiving communication beam information for a first base station, configuring a set of resources as an interference coordination region between the first base station and a second base station based on the communication beam information for the first base station, where the interference coordination region includes one or both of a set of beam-avoidance sub-regions or a set of beam-preference sub-regions, and transmitting an indication of the set of resources configured as the interference coordination region to the first base station.

In example 20, the device in the wireless network of example 19 is an example of a centralized unit, and the method of example 19 includes receiving communication beam information for the second base station, where the set of resources may be configured as the interference coordination region further based on the communication beam information for the second base station.

In example 21, the method of example 20 includes configuring a second set of resources as a second interference coordination region between the second base station and the first base station based on the communication beam information for the second base station and the communication beam information for the first base station, where the second interference coordination region includes one or both of a second set of beam-avoidance sub-regions or a second set of beam-preference sub-regions, and transmitting an indication of the second set of resources configured as the second interference coordination region to the second base station.

In example 22, each beam-avoidance sub-region of the interference coordination region of example 21 may be configured as a respective beam-preference sub-region of the second interference coordination region, and each beam-preference sub-region of the interference coordination region of example 21 may be configured as a respective beam-avoidance sub-region of the second interference coordination region.

In example 23, the method of either of examples 21 or 22 includes receiving communication beam information for a third base station and configuring a third set of resources as a third interference coordination region for the third base station, where the interference coordination region, the second interference coordination region, and the third interference coordination region may be the same.

In example 24, the device in the wireless network of example 19 is the second base station, and the method of example 19 includes determining communication beam information for the second base station, where the set of resources may be configured as the interference coordination region further based on the communication beam information for the second base station.

In example 25, the method of example 24 includes configuring a second set of resources as a second interference coordination region between the second base station and the first base station based on the communication beam information for the second base station and the communication beam information for the first base station, where the second interference coordination region includes one or both of a second set of beam-avoidance sub-regions or a second set of beam-preference sub-regions, scheduling a communication beam for communication in the second interference coordination region based on one or both of a beam-avoidance sub-region of the second set of beam-avoidance sub-regions or a beam-preference sub-region of the second set of beam-preference sub-regions, and transmitting a message to a UE in the second interference coordination region using the scheduled communication beam.

In example 26, each beam-avoidance sub-region of the interference coordination region of example 25 may be configured as a respective beam-preference sub-region of the second interference coordination region, and each beam-preference sub-region of the interference coordination region of example 25 may be configured as a respective beam-avoidance sub-region of the second interference coordination region.

In example 27, configuring the set of resources as the interference coordination region of any of examples 19-26 includes determining the set of resources based on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

In example 28, the set of resources configured as the interference coordination region of any of examples 19-27 may be one or both of FDMed or TDMed with a second set of resources configured for communication.

In example 29, one or both of the set of beam-avoidance sub-regions or the set of beam-preference sub-regions of any of examples 19-28 may be one or both of FDMed or TDMed in the interference coordination region.

In example 30, the set of resources configured as the interference coordination region of any of examples 19-29 may be repeated in time according to a periodicity.

Example 31 is a system or apparatus including means for implementing a method or realizing an apparatus as in any of examples 19-30.

Example 32 is a non-transitory computer-readable medium storing instructions executable by one or more processors to cause the one or more processors to implement a method as in any of examples 19-30.

Example 33 is a system including one or more processors and memory in electronic communication with the one or more processors storing instructions executable by the one or more processors to cause the system or apparatus to implement a method as in any of examples 19-30.

Example 34 is a method of wireless communications at a first UE that includes identifying a scheduled transmission from a serving base station to the first UE in a first cell using a communication beam in a beam-preference region for the communication beam, receiving an indication of a second transmission to a second UE different from the first UE in a second cell different from the first cell that interferes with the scheduled transmission, transmitting, to the serving base station, an indication of the second UE based on the second transmission that interferes with the scheduled transmission, and receiving, from the serving base station, the scheduled transmission modified based on the indication of the second UE.

In example 35, receiving the indication of the second transmission to the second UE of example 34 includes receiving an OTA signal from the second UE indicating the second transmission to the second UE.

In example 36, the method of example 35 includes monitoring for the OTA signal from the second UE in a pre-configured resource region shared by the serving base station and a second base station serving the second UE and different from the serving base station.

In example 37, the OTA signal of either of examples 35 or 36 includes one or more of DCI, a MAC CE, or a reference signal.

In example 38, receiving the indication of the second transmission to the second UE of any of examples 34-37 includes receiving the second transmission in the beam-preference region.

In example 39, the method of example 38 includes determining an interference power of the second transmission on the scheduled transmission based on a DMRS for the second transmission and transmitting, to the serving base station, an indication of the interference power, where the scheduled transmission may be further modified based on the indication of the interference power.

In example 40, the scheduled transmission of any of examples 34-39 may be modified with a decreased MCS index based on the indication of the second UE.

In example 41, the method of any of examples 34-40 includes receiving, from the serving base station, an indication of the beam-preference region.

Example 42 is a system or apparatus including means for implementing a method or realizing an apparatus as in any of examples 34-41.

Example 43 is a non-transitory computer-readable medium storing instructions executable by one or more processors to cause the one or more processors to implement a method as in any of examples 34-41.

Example 44 is a system including one or more processors and memory in electronic communication with the one or more processors storing instructions executable by the one or more processors to cause the system or apparatus to implement a method as in any of examples 34-41.

Aspects of these examples may be combined with aspects or embodiments disclosed in other implementations.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first base station, comprising:
configuring a set of resources as an interference coordination region comprising one or both of a set of beam-avoidance sub-regions or a set of beam-preference sub-regions between the first base station and a second base station, wherein each beam-avoidance sub-region of a second interference coordination region associated with the second base station is configured as a respective beam-preference sub-region of the interference coordination region and each beam-preference sub-region of the second interference coordination region is configured as a respective beam-avoidance sub-region of the interference coordination region;
scheduling a communication beam for communication in the interference coordination region based at least in part on one or both of a beam-avoidance sub-region of the set of beam-avoidance sub-regions or a beam-preference sub-region of the set of beam-preference sub-regions; and
transmitting a message to a user equipment (UE) in the interference coordination region using the scheduled communication beam.

2. The method of claim 1, wherein scheduling the communication beam comprises:
determining a first communication beam associated with the beam-preference sub-region; and
scheduling the first communication beam for communication in the beam-preference sub-region.

3. The method of claim 2, further comprising:
selecting a first modulation and coding scheme index for transmission in the beam-preference sub-region that is greater than a second modulation and coding scheme index for transmission in a second set of resources for communication.

4. The method of claim 3, further comprising:
receiving an indication of an interfering transmission to the UE in the beam-preference sub-region; and
reducing the first modulation and coding scheme index for transmission in the beam-preference sub-region based at least in part on the indication of the interfering transmission.

5. The method of claim 1, wherein scheduling the communication beam comprises:
determining a first communication beam associated with the beam-avoidance sub-region; and
refraining from scheduling the first communication beam for communication in the beam-avoidance sub-region.

6. The method of claim 1, wherein scheduling the communication beam comprises:
determining a first communication beam associated with the beam-avoidance sub-region; and
scheduling the first communication beam for communication in the beam-avoidance sub-region based at least in part on one or both of a priority level of the UE or a priority level of the message.

7. The method of claim 1, further comprising:
receiving, from the second base station, one or both of communication beam information or configuration information associated with the second base station, wherein the set of resources is configured as the interference coordination region based at least in part on one or both of the communication beam information or the configuration information.

8. The method of claim 1, wherein configuring the set of resources as the interference coordination region comprises:
receiving, from a centralized unit, a configuration of the set of resources as the interference coordination region.

9. The method of claim 8, wherein the configuration of the set of resources as the interference coordination region is common for each base station.

10. The method of claim 1, wherein configuring the set of resources as the interference coordination region comprises:
receiving, from the second base station, a configuration for the second base station of a second set of resources as the second interference coordination region between the second base station and the first base station, wherein the set of resources configured as the interference coordination region is the same as the second set of resources configured as the second interference coordination region.

11. The method of claim 1, wherein configuring the set of resources as the interference coordination region comprises:

determining the set of resources based at least in part on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

12. The method of claim 1, wherein the set of resources configured as the interference coordination region is one or both of frequency division multiplexed or time division multiplexed with a second set of resources configured for communication.

13. The method of claim 1, wherein one or both of the set of beam-avoidance sub-regions or the set of beam-preference sub-regions is one or both of frequency division multiplexed or time division multiplexed in the interference coordination region.

14. The method of claim 1, wherein the set of resources configured as the interference coordination region is repeated in time according to a periodicity.

15. A method for wireless communications at a device in a wireless network, comprising:
receiving communication beam information for a first base station;
configuring a set of resources as an interference coordination region between the first base station and a second base station based at least in part on the communication beam information for the first base station, wherein the interference coordination region comprises one or both of a set of beam-avoidance sub-regions or a set of beam-preference sub-regions, each beam-avoidance sub-region of a second interference coordination region associated with the second base station configured as a respective beam-preference sub-region of the interference coordination region and each beam-preference sub-region of the second interference coordination region configured as a respective beam-avoidance sub-region of the interference coordination region; and
transmitting an indication of the set of resources configured as the interference coordination region to the first base station.

16. The method of claim 15, wherein the device in the wireless network comprises a centralized unit, the method further comprising:
receiving communication beam information for the second base station, wherein the set of resources is configured as the interference coordination region further based at least in part on the communication beam information for the second base station.

17. The method of claim 16, further comprising:
configuring a second set of resources as the second interference coordination region between the second base station and the first base station based at least in part on the communication beam information for the second base station and the communication beam information for the first base station, wherein the second interference coordination region comprises one or both of a second set of beam-avoidance sub-regions or a second set of beam-preference sub-regions; and transmitting an indication of the second set of resources configured as the second interference coordination region to the second base station.

18. The method of claim 17, further comprising:
receiving communication beam information for a third base station; and
configuring a third set of resources as a third interference coordination region for the third base station, wherein the interference coordination region, the second interference coordination region, and the third interference coordination region are the same.

19. The method of claim 15, wherein the device in the wireless network comprises the second base station, the method further comprising:
determining communication beam information for the second base station, wherein the set of resources is configured as the interference coordination region further based at least in part on the communication beam information for the second base station.

20. The method of claim 19, further comprising:
configuring a second set of resources as the second interference coordination region between the second base station and the first base station based at least in part on the communication beam information for the second base station and the communication beam information for the first base station, wherein the second interference coordination region comprises one or both of a second set of beam-avoidance sub-regions or a second set of beam-preference sub-regions;
scheduling a communication beam for communication in the second interference coordination region based at least in part on one or both of a beam-avoidance sub-region of the second set of beam-avoidance sub-regions or a beam-preference sub-region of the second set of beam-preference sub-regions; and
transmitting a message to a user equipment (UE) in the second interference coordination region using the scheduled communication beam.

21. The method of claim 15, wherein configuring the set of resources as the interference coordination region comprises:
determining the set of resources based at least in part on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

22. The method of claim 15, wherein the set of resources configured as the interference coordination region is one or both of frequency division multiplexed or time division multiplexed with a second set of resources configured for communication.

23. The method of claim 15, wherein one or both of the set of beam-avoidance sub-regions or the set of beam-preference sub-regions is one or both of frequency division multiplexed or time division multiplexed in the interference coordination region.

24. The method of claim 15, wherein the set of resources configured as the interference coordination region is repeated in time according to a periodicity.

25. An apparatus for wireless communications at a first base station, comprising:
- a processor;
- memory coupled with the processor; and
- one or more instructions stored in the memory and executable by the processor to cause the apparatus to, based at least in part on the one or more instructions:
  - configure a set of resources as an interference coordination region comprising one or both of a set of beam-avoidance sub-regions or a set of beam-preference sub-regions between the first base station and a second base station, wherein each beam-avoidance sub-region of a second interference coordination region associated with the second base station is configured as a respective beam-preference sub-region of the interference coordination region and each beam-preference sub-region of the second interference coordination region is configured as a respective beam-avoidance sub-region of the interference coordination region;
  - schedule a communication beam for communication in the interference coordination region based at least in part on one or both of a beam-avoidance sub-region of the set of beam-avoidance sub-regions or a beam-preference sub-region of the set of beam-preference sub-regions; and
  - transmit a message to a user equipment (UE) in the interference coordination region using the scheduled communication beam.

26. The apparatus of claim 25, wherein the one or more instructions to schedule the communication beam are executable by the processor to cause the apparatus to:
- determine a first communication beam associated with the beam-preference sub-region; and
- schedule the first communication beam for communication in the beam-preference sub-region.

27. The apparatus of claim 26, wherein the one or more instructions are further executable by the processor to cause the apparatus to:
- select a first modulation and coding scheme index for transmission in the beam-preference sub-region that is greater than a second modulation and coding scheme index for transmission in a second set of resources for communication.

28. The apparatus of claim 27, wherein the one or more instructions are further executable by the processor to cause the apparatus to:
- receive an indication of an interfering transmission to the UE in the beam-preference sub-region; and
- reduce the first modulation and coding scheme index for transmission in the beam-preference sub-region based at least in part on the indication of the interfering transmission.

29. The apparatus of claim 25, wherein the one or more instructions to schedule the communication beam are executable by the processor to cause the apparatus to:
- determine a first communication beam associated with the beam-avoidance sub-region; and
- refrain from scheduling the first communication beam for communication in the beam-avoidance sub-region.

30. The apparatus of claim 25, wherein the one or more instructions to schedule the communication beam are executable by the processor to cause the apparatus to:
- determine a first communication beam associated with the beam-avoidance sub-region; and
- schedule the first communication beam for communication in the beam-avoidance sub-region based at least in part on one or both of a priority level of the UE or a priority level of the message.

31. The apparatus of claim 25, wherein the one or more instructions are further executable by the processor to cause the apparatus to:
- receive one or both of communication beam information or configuration information associated with the second base station, wherein the one or more instructions to configure the set of resources as the interference coordination region are executable by the processor to cause the apparatus to configure the set of resources as the interference coordination region based at least in part on one or both of the communication beam information or the configuration information.

32. The apparatus of claim 25, wherein the one or more instructions to configure the set of resources as the interference coordination region are executable by the processor to cause the apparatus to:
- receive, from a centralized unit, a configuration of the set of resources as the interference coordination region.

33. The apparatus of claim 32, wherein the configuration of the set of resources as the interference coordination region is common for each base station.

34. The apparatus of claim 25, wherein the one or more instructions to configure the set of resources as the interference coordination region are executable by the processor to cause the apparatus to:
- receive, from the second base station, a configuration for the second base station of a second set of resources as the second interference coordination region between the second base station and the first base station, wherein the set of resources configured as the interference coordination region is the same as the second set of resources configured as the second interference coordination region.

35. The apparatus of claim 25, wherein the one or more instructions to configure the set of resources as the interference coordination region are executable by the processor to cause the apparatus to:
- determine the set of resources based at least in part on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

36. An apparatus for wireless communications at a device in a wireless network, comprising:
- a processor;
- memory coupled with the processor; and
- one or more instructions stored in the memory and executable by the processor to cause the apparatus to, based at least in part on the one or more instructions:
  - receive communication beam information for a first base station;
  - configure a set of resources as an interference coordination region between the first base station and a second base station based at least in part on the communication beam information for the first base station, wherein the interference coordination region comprises one or both of a set of beam-avoidance sub-regions or a set of beam-preference sub-regions, each beam-avoidance sub-region of a second interference coordination region associated with the second base station configured as a respective beam-preference sub-region of the interference coordination region and each beam-preference sub-region of the second interference coordination region configured as a respective beam-avoidance sub-region of the interference coordination region; and transmit an indication of the set of resources configured as the interference coordination region to the first base station.

37. The apparatus of claim 36, wherein the device in the wireless network comprises a centralized unit, and the one or more instructions are further executable by the processor to cause the apparatus to:

receive communication beam information for the second base station, wherein the one or more instructions to configure the set of resources as the interference coordination region are executable by the processor to cause the apparatus to configure the set of resources as the interference coordination region further based at least in part on the communication beam information for the second base station.

38. The apparatus of claim 37, wherein the one or more instructions are further executable by the processor to cause the apparatus to:

configure a second set of resources as the second interference coordination region between the second base station and the first base station based at least in part on the communication beam information for the second base station and the communication beam information for the first base station, wherein the second interference coordination region comprises one or both of a second set of beam-avoidance sub-regions or a second set of beam-preference sub-regions; and transmit an indication of the second set of resources configured as the second interference coordination region to the second base station.

39. The apparatus of claim 38, wherein the one or more instructions are further executable by the processor to cause the apparatus to:

receive communication beam information for a third base station; and configure a third set of resources as a third interference coordination region for the third base station, wherein the interference coordination region, the second interference coordination region, and the third interference coordination region are the same.

40. The apparatus of claim 36, wherein the device in the wireless network comprises the second base station, and the one or more instructions are further executable by the processor to cause the apparatus to:

determine communication beam information for the second base station, wherein the one or more instructions to configure the set of resources as the interference coordination region are executable by the processor to cause the apparatus to configure the set of resources as the interference coordination region further based at least in part on the communication beam information for the second base station.

41. The apparatus of claim 40, wherein the one or more instructions are further executable by the processor to cause the apparatus to:

configure a second set of resources as the second interference coordination region between the second base station and the first base station based at least in part on the communication beam information for the second base station and the communication beam information for the first base station, wherein the second interference coordination region comprises one or both of a second set of beam-avoidance sub-regions or a second set of beam-preference sub-regions;

schedule a communication beam for communication in the second interference coordination region based at least in part on one or both of a beam-avoidance sub-region of the second set of beam-avoidance sub-regions or a beam-preference sub-region of the second set of beam-preference sub-regions; and transmit a message to a user equipment (UE) in the second interference coordination region using the scheduled communication beam.

42. The apparatus of claim 36, wherein the one or more instructions to configure the set of resources as the interference coordination region are executable by the processor to cause the apparatus to:

determine the set of resources based at least in part on one or more of a communication beam index for the first base station, a communication beam index for the second base station, a data traffic type for the first base station, a data traffic type for the second base station, an amount of data traffic for the first base station, an amount of data traffic for the second base station, a UE priority for the first base station, a UE priority for the second base station, a link quality for the first base station, a link quality for the second base station, or configuration information for a third base station different from the first base station and the second base station.

43. An apparatus for wireless communications at a first base station, comprising:

means for configuring a set of resources as an interference coordination region comprising one or both of a set of beam-avoidance sub-regions or a set of beam-preference sub-regions between the first base station and a second base station, wherein each beam-avoidance sub-region of a second interference coordination region associated with the second base station is configured as a respective beam-preference sub-region of the interference coordination region and each beam-preference sub-region of the second interference coordination region is configured as a respective beam-avoidance sub-region of the interference coordination region;

means for scheduling a communication beam for communication in the interference coordination region based at least in part on one or both of a beam-avoidance sub-region of the set of beam-avoidance sub-regions or a beam-preference sub-region of the set of beam-preference sub-regions; and means for transmitting a message to a user equipment (UE) in the interference coordination region using the scheduled communication beam.

44. An apparatus for wireless communications at a device in a wireless network, comprising:

means for receiving communication beam information for a first base station;

means for configuring a set of resources as an interference coordination region between the first base station and a second base station based at least in part on the communication beam information for the first base station, wherein the interference coordination region comprises one or both of a set of beam-avoidance sub-regions or a set of beam-preference sub-regions, each beam-avoidance sub-region of a second interference coordination region associated with the second base station configured as a respective beam-preference sub-region of the interference coordination region and each beam-preference sub-region of the second interference coordination region configured as a respective beam-avoidance sub-region of the interference coordination region; and means for transmitting an indication of the set of resources configured as the interference coordination region to the first base station.

45. A non-transitory computer-readable medium storing code for wireless communications at a first base station, the code comprising instructions executable by a processor to:

configure a set of resources as an interference coordination region comprising one or both of a set of beam-avoidance sub-regions or a set of beam-preference sub-regions between the first base station and a second base station, wherein each beam-avoidance sub-region of a second interference coordination region associated with the second base station is configured as a respective beam-preference sub-region of the interference coordination region and each beam-preference sub-region of the second interference coordination region is configured as a respective beam-avoidance sub-region of the interference coordination region;

schedule a communication beam for communication in the interference coordination region based at least in part on one or both of a beam-avoidance sub-region of the set of beam-avoidance sub-regions or a beam-preference sub-region of the set of beam-preference sub-regions; and transmit a message to a user equipment (UE) in the interference coordination region using the scheduled communication beam.

46. A non-transitory computer-readable medium storing code for wireless communications at a device in a wireless network, the code comprising instructions executable by a processor to:

receive communication beam information for a first base station;

configure a set of resources as an interference coordination region between the first base station and a second base station based at least in part on the communication beam information for the first base station, wherein the interference coordination region comprises one or both of a set of beam-avoidance sub-regions or a set of beam-preference sub-regions, each beam-avoidance sub-region of a second interference coordination region associated with the second base station configured as a respective beam-preference sub-region of the interference coordination region and each beam-preference sub-region of the second interference coordination region configured as a respective beam-avoidance sub-region of the interference coordination region; and transmit an indication of the set of resources configured as the interference coordination region to the first base station.

* * * * *